(12) United States Patent
Zimring et al.

(10) Patent No.: US 11,662,051 B2
(45) Date of Patent: May 30, 2023

(54) SHADOW TRACKING OF REAL-TIME INTERACTIVE SIMULATIONS FOR COMPLEX SYSTEM ANALYSIS

(71) Applicant: GOOGLE LLC, Mountain View, CA (US)

(72) Inventors: Dov Zimring, Belmont, CA (US); Paul Leventis, Toronto (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/734,275

(22) PCT Filed: Nov. 14, 2019

(86) PCT No.: PCT/US2019/061407
§ 371 (c)(1),
(2) Date: Dec. 2, 2020

(87) PCT Pub. No.: WO2020/102493
PCT Pub. Date: May 22, 2020

(65) Prior Publication Data
US 2021/0365328 A1 Nov. 25, 2021

Related U.S. Application Data

(60) Provisional application No. 62/768,780, filed on Nov. 16, 2018.

(51) Int. Cl.
*F16L 55/48* (2006.01)
*F16L 55/46* (2006.01)
(Continued)

(52) U.S. Cl.
CPC ............ *F16L 55/48* (2013.01); *F16L 55/46* (2013.01); *G01C 21/16* (2013.01); *G01V 3/12* (2013.01);
(Continued)

(58) Field of Classification Search
CPC ............ G06F 11/1469; G06F 11/0778; G06F 11/1695; G06F 11/3636; G06F 11/3648;
(Continued)

(56) References Cited

U.S. PATENT DOCUMENTS 5,892,897 A * 4/1999 Carlson ............... G06F 11/3648
714/37
6,393,582 B1 * 5/2002 Klecka ................ G06F 11/1658
714/10

(Continued)

FOREIGN PATENT DOCUMENTS

CN 1556958 A 12/2004
CN 101068258 A 11/2007
(Continued)

OTHER PUBLICATIONS

Nourani, Mehrdad, and T. M. Mak. "Coping with physical failures, soft errors, and reliability issues." System-on-Chip Test Architectures. Morgan Kaufmann, 2008. 351-422. (Year: 2008).*
(Continued)

*Primary Examiner* — S. Sough
*Assistant Examiner* — Joanne G Macasiano

(57) ABSTRACT

An electronic computing system preserves a pre-error state of a processing unit by receiving a first stream of inputs; buffering the first stream of inputs to generate a buffered stream of inputs identical to the first stream of inputs; conveying the first stream to a primary instance of a first program; conveying the buffered stream to a secondary instance of the first program; executing the primary instance on the first stream in real time; executing the secondary instance on the buffered stream with a predefined time delay with respect to execution of the primary instance on the first stream; detecting an error state resulting from execution of the primary instance; and in response to detecting the error state, pausing the secondary instance and preserving a
(Continued)

current state of the secondary instance, wherein the current state of the secondary instance corresponds to a pre-error state of the primary instance.

21 Claims, 10 Drawing Sheets

(51) Int. Cl.
  G01C 21/16  (2006.01)
  G01V 3/12   (2006.01)
  H04N 7/18   (2006.01)
  G06F 11/07  (2006.01)
  G06F 11/14  (2006.01)
  G06F 11/16  (2006.01)
  G06F 11/36  (2006.01)
  H04N 23/54  (2023.01)
  H04N 23/56  (2023.01)
  H04N 23/741 (2023.01)
  F16L 101/30 (2006.01)
  H04N 23/50  (2023.01)

(52) U.S. Cl.
  CPC ...... G06F 11/0778 (2013.01); G06F 11/1469 (2013.01); G06F 11/1695 (2013.01); G06F 11/366 (2013.01); G06F 11/3636 (2013.01); G06F 11/3648 (2013.01); H04N 7/183 (2013.01); H04N 23/54 (2023.01); H04N 23/56 (2023.01); H04N 23/741 (2023.01); F16L 2101/30 (2013.01); G06F 11/0706 (2013.01); G06F 2201/82 (2013.01); H04N 23/555 (2023.01)

(58) Field of Classification Search
  CPC ............... G06F 11/366; G06F 11/0706; G06F 2201/82; G06F 11/0709; G06F 11/0715; G06F 11/1407; G06F 11/1471; G06F 11/3466; F16L 55/48; F16L 55/46; F16L 2101/30; G01C 21/16; G01V 3/12; H04N 5/2253; H04N 5/2256; H04N 5/2355; H04N 5/2255; H04N 7/183; H04N 2005/2255; H04N 23/741; H04N 23/54; H04N 23/56; H04N 23/555
  See application file for complete search history.

(56) References Cited

U.S. PATENT DOCUMENTS

| | | | |
|---|---|---|---|
| 6,855,058 B2 | 2/2005 | Kubota et al. |
| 7,015,909 B1 | 3/2006 | Morgan, III et al. |
| 7,401,150 B2 | 7/2008 | Shea et al. |
| 7,774,440 B1 | 8/2010 | Bagrodia |
| 8,171,145 B2 | 5/2012 | Allen et al. |
| 8,619,588 B2 | 12/2013 | Karacali-Akyamac |
| 8,621,585 B2 | 12/2013 | Danieli et al. |
| 8,641,531 B2 | 2/2014 | Patil |
| 9,208,642 B2 | 12/2015 | Merari |
| 9,295,915 B2 | 3/2016 | Bruno, Jr. et al. |
| 9,339,733 B2 | 5/2016 | Boudville |
| 9,393,486 B2 | 7/2016 | George |
| 9,396,702 B2 | 7/2016 | Colenbrander |
| 9,498,711 B2 | 11/2016 | Assa |
| 9,526,989 B2 | 12/2016 | Oh |
| 9,592,446 B2 | 3/2017 | Bono et al. |
| 9,628,332 B2 | 4/2017 | Bruno, Jr. et al. |
| 9,675,874 B1 | 6/2017 | Park |
| 9,912,562 B2 | 3/2018 | Callahan et al. |
| 10,016,689 B2 | 7/2018 | Lucas et al. |
| 10,166,471 B2 | 1/2019 | Vincent et al. |
| 10,244,765 B2 | 4/2019 | Pierce et al. |
| 10,255,765 B2 | 4/2019 | Washington et al. |
| 10,456,672 B2 | 10/2019 | Champy |
| 10,486,066 B2 | 11/2019 | Perry et al. |
| 11,128,636 B1 | 9/2021 | Jorasch et al. |
| 11,369,873 B2 | 6/2022 | Smullen et al. |
| 2002/0144177 A1* | 10/2002 | Kondo ............... G06F 11/1441 714/13 |
| 2004/0198403 A1 | 10/2004 | Pedersen et al. |
| 2005/0074063 A1 | 4/2005 | Nair et al. |
| 2006/0154710 A1 | 7/2006 | Serafat |
| 2006/0287096 A1 | 12/2006 | O'Kelley et al. |
| 2006/0287099 A1 | 12/2006 | Shaw et al. |
| 2007/0018980 A1 | 1/2007 | Berteig et al. |
| 2007/0203768 A1 | 8/2007 | Adra |
| 2007/0293319 A1 | 12/2007 | Stamper et al. |
| 2008/0102955 A1 | 5/2008 | D'Amora et al. |
| 2008/0220878 A1 | 9/2008 | Michaelis |
| 2009/0008404 A1 | 1/2009 | Kim et al. |
| 2009/0111576 A1 | 4/2009 | Ostergren et al. |
| 2009/0119730 A1 | 5/2009 | Perlman et al. |
| 2009/0125961 A1 | 5/2009 | Perlman et al. |
| 2009/0271656 A1 | 10/2009 | Yokota et al. |
| 2010/0016081 A1 | 1/2010 | Prochnow |
| 2010/0073712 A1 | 3/2010 | Cain |
| 2010/0167809 A1 | 7/2010 | Perlman et al. |
| 2010/0203952 A1 | 8/2010 | Zalewski |
| 2010/0306813 A1 | 12/2010 | Perry et al. |
| 2011/0124417 A1 | 5/2011 | Baynes et al. |
| 2011/0145635 A1 | 6/2011 | Buckler et al. |
| 2012/0004042 A1 | 1/2012 | Perry et al. |
| 2012/0079080 A1 | 3/2012 | Pishevar |
| 2012/0209571 A1 | 8/2012 | Peterson et al. |
| 2012/0270644 A1 | 10/2012 | Buhr |
| 2012/0306877 A1 | 12/2012 | Rosasco |
| 2013/0017443 A1 | 1/2013 | Yamazaki |
| 2013/0034160 A1 | 2/2013 | Schmit |
| 2013/0198642 A1 | 8/2013 | Carney et al. |
| 2013/0221923 A1 | 8/2013 | Robertson |
| 2013/0274000 A1 | 10/2013 | Novotny et al. |
| 2014/0006517 A1 | 1/2014 | Hsiao et al. |
| 2014/0019582 A1 | 1/2014 | Kim |
| 2014/0032670 A1 | 1/2014 | Ellingson et al. |
| 2014/0043333 A1 | 2/2014 | Narayanan et al. |
| 2014/0066195 A1 | 3/2014 | Matsui et al. |
| 2014/0179426 A1 | 6/2014 | Perry et al. |
| 2014/0179434 A1 | 6/2014 | Xu |
| 2014/0221087 A1 | 8/2014 | Huang et al. |
| 2014/0274380 A1 | 9/2014 | Kazama |
| 2014/0274384 A1 | 9/2014 | Boswell et al. |
| 2014/0323230 A1 | 10/2014 | Wakitani et al. |
| 2014/0342819 A1 | 11/2014 | Bruno, Jr. et al. |
| 2014/0359156 A1 | 12/2014 | Manber |
| 2015/0009222 A1 | 1/2015 | Diard et al. |
| 2015/0024842 A1 | 1/2015 | Imai et al. |
| 2015/0087414 A1 | 3/2015 | Chen et al. |
| 2015/0109185 A1 | 4/2015 | Shimamura et al. |
| 2015/0194136 A1 | 7/2015 | Diard et al. |
| 2015/0221063 A1 | 8/2015 | Kim et al. |
| 2015/0297998 A1 | 10/2015 | Karamilov et al. |
| 2016/0001184 A1 | 1/2016 | Sepulveda et al. |
| 2016/0028854 A1 | 1/2016 | Leeb et al. |
| 2016/0171757 A1 | 6/2016 | Panneer et al. |
| 2016/0279523 A1 | 9/2016 | Altagar et al. |
| 2016/0293134 A1 | 10/2016 | Fortin |
| 2016/0317921 A1 | 11/2016 | Schmitz et al. |
| 2016/0354688 A1 | 12/2016 | Harkham |
| 2017/0007659 A1 | 1/2017 | Wadhwa et al. |
| 2017/0034234 A1 | 2/2017 | Zimring et al. |
| 2017/0050111 A1 | 2/2017 | Perry et al. |
| 2017/0083396 A1 | 3/2017 | Bishop et al. |
| 2017/0087460 A1 | 3/2017 | Perry |
| 2017/0097816 A1 | 4/2017 | Joshi |
| 2017/0124812 A1 | 5/2017 | Washington et al. |
| 2017/0142201 A1 | 5/2017 | Holmes |
| 2017/0185464 A1 | 6/2017 | Lipinski et al. |
| 2017/0246544 A1 | 8/2017 | Agarwal et al. |
| 2017/0354878 A1 | 12/2017 | Posin |
| 2017/0354893 A1 | 12/2017 | Benedetto et al. |
| 2018/0176282 A1 | 6/2018 | Benguerah |
| 2018/0229128 A1 | 8/2018 | Chandrasekaran et al. |

(56) References Cited

U.S. PATENT DOCUMENTS

| | | |
|---|---|---|
| 2018/0250591 A1 | 9/2018 | Prado Rojas et al. |
| 2018/0253880 A1 | 9/2018 | Yeh et al. |
| 2018/0256981 A1 | 9/2018 | Enomoto |
| 2018/0290061 A1 | 10/2018 | Payzer et al. |
| 2019/0199722 A1 | 6/2019 | Pennarun et al. |
| 2019/0259130 A1 | 8/2019 | Yeh et al. |
| 2019/0262723 A1 | 8/2019 | Trombetta et al. |
| 2019/0272707 A1 | 9/2019 | Washington et al. |
| 2019/0308099 A1 | 10/2019 | Lalonde et al. |
| 2019/0321725 A1 | 10/2019 | Zimring et al. |
| 2019/0321727 A1 | 10/2019 | Rodgers |
| 2019/0321732 A1 | 10/2019 | Zimring et al. |
| 2020/0001177 A1 | 1/2020 | Champy |
| 2020/0111317 A1 | 4/2020 | Oberberger et al. |
| 2021/0146240 A1 | 5/2021 | Colenbrander |

FOREIGN PATENT DOCUMENTS

| | | |
|---|---|---|
| CN | 101887485 A | 11/2010 |
| CN | 102195935 A | 9/2011 |
| CN | 104598292 A | 5/2015 |
| CN | 104866699 A | 8/2015 |
| CN | 105749551 A | 7/2016 |
| CN | 106328855 A | 1/2017 |
| CN | 107050858 A | 8/2017 |
| CN | 107666943 A | 2/2018 |
| CN | 107670275 A | 2/2018 |
| EP | 1374959 A2 | 1/2004 |
| EP | 2546811 A1 | 1/2013 |
| EP | 2621594 B1 | 8/2016 |
| EP | 3610933 A1 | 2/2020 |
| GB | 2525437 A | 10/2015 |
| JP | 2014130589 A | 7/2014 |
| JP | 2015139565 A | 8/2015 |
| KR | 20070082395 | 8/2007 |
| WO | 2004004857 A1 | 1/2004 |
| WO | 2005010680 A2 | 2/2005 |
| WO | 2005074063 A2 | 8/2005 |
| WO | 2007033005 A2 | 3/2007 |
| WO | 2007044908 A2 | 4/2007 |
| WO | 2008104221 A1 | 4/2008 |
| WO | 2012161102 A1 | 11/2012 |
| WO | 2012170437 A1 | 12/2012 |
| WO | 2013151748 A2 | 10/2013 |
| WO | 2014085717 A1 | 6/2014 |
| WO | 2014120369 A1 | 8/2014 |
| WO | 2014186858 A1 | 11/2014 |
| WO | 2015098165 A2 | 7/2015 |
| WO | 2015164397 A2 | 10/2015 |
| WO | 2015175231 A2 | 11/2015 |
| WO | 2015191965 A2 | 12/2015 |
| WO | 2016014603 A1 | 1/2016 |
| WO | 2016183253 A1 | 11/2016 |
| WO | 2017007659 A1 | 1/2017 |
| WO | 2017201472 A1 | 11/2017 |
| WO | 2019074952 A2 | 4/2019 |
| WO | 2019182752 A1 | 9/2019 |
| WO | 2019195300 A2 | 10/2019 |
| WO | 2020102493 A1 | 5/2020 |

OTHER PUBLICATIONS

Emmerson, Richard, and Michael J. McGowan. "Fault tolerance achieved in VLSI." IEEE Micro 4.6 (1984): 34-43. (Year: 1984).*

English Translation of Chinese Office Action dated Aug. 11, 2021 for CN Application No. 201980007131.3, 21 pages.

Office Action dated Feb. 19, 2021 for European Patent Application No. 18797260.9, 6 pages.

Yadav, Himanshu, et al., "Adaptive GPU Resource Scheduling on Virtualized Servers in Cloud Gaming", Conference an Information and Communication Technology, Nov. 2017, 6 pages.

First Examination Report dated Jun. 26, 2021 for Indian Application No. 202047027952, 6 pages.

Notice of Allowance dated Aug. 11, 2021 for U.S. Appl. No. 16/849,805, 64 pages.

Non-Final Office Action dated Mar. 31, 2021 for U.S. Appl. No. 16/566,607, 19 pages.

International Search Report and Written Opinion dated Feb. 24, 2020 for International Application No. PCT/US2019/061407, 11 pages.

Notice of Allowance dated Dec. 30, 2020 for U.S. Appl. No. 16/380,831, 72 pages.

Extended European Search Report dated Jan. 3, 2020 for EP Application No. EP 19199853.3, 10 pages.

Notice of Grant dated Nov. 5, 2019 for JP Application No. JP 2019220516, 7 pages. English machine translation included.

English Translation of Japanese Office Action dated May 18, 2021 for JP Application No. 2019-220516, 7 pages.

English Translation of Korean Notice of Allowance dated Jan. 28, 2020 for KR Application No. KR 10-2018-7023961, 3 pages.

English Translation of Korean Office Action dated Apr. 15, 2019 for KR Application No. KR 10-2018-7023961, 2 pages.

English Translation of Korean Office Action dated Aug. 18, 2018 for KR Application No. KR 10-2020-7002403, 5 pages.

International Preliminary Report on Patentability dated Apr. 24, 2018 for International Application No. PCT/US2017/033642, 13 pages.

International Search Report and Written Opinion dated Sep. 18, 2017 for International Application No. PCT/US2017/033642, 28 pages.

First Action Interview Office Action Summary dated Feb. 26, 2019 for U.S. Appl. No. 15/599,408, 3 pages.

First Action Interview Pilot Program Pre-Interview Communication dated Jan. 8, 2019 for U.S. Appl. No. 15/599,408, 4 pages.

Notice of Allowance dated Jun. 19, 2019 for U.S. Appl. No. 15/599,408, 6 pages.

Non-Final Office Action dated Jun. 12, 2020 for U.S. Appl. No. 16/566,607, 23 pages.

Final Office Action dated Oct. 16, 2020 for U.S. Appl. No. 16/566,607), 18 pages.

International Search Report and Written Opinion dated Feb. 26, 2019 for International Application No. PCT/US2018/066844, 13 pages.

Non-Final Office Action dated May 15, 2020 for U.S. Appl. No. 15/851,610, 15 pages.

Final Office Action dated Nov. 30, 2020 for U.S. Appl. No. 15/851,610, 33 pages.

Notice of Allowance dated May 17, 2021 for U.S. Appl. No. 15/851,610, 23 pages.

International Preliminary Report on Patentability dated Apr. 14, 2020 for International Application No. PCT/US2018/055055, 13 pages.

International Search Report and Written Opinion dated Apr. 26, 2019 for International Application No. PCT/US2018/055055, 21 pages.

International Search Report and Written Opinion dated Oct. 4, 2019 for International Application No. PCT/US2019/025182, 23 pages.

International Preliminary Report on Patentability dated Oct. 15, 2020 for International Application No. PCT/US2019/025182, 18 pages.

First Action Interview Pilot Program Pre-Interview Communication dated Apr. 9, 2020 for U.S. Appl. No. 16/368,801, 4 pages.

Notice of Allowance dated Jun. 10, 2020 for U.S. Appl. No. 16/368,801, 12 pages.

International Search Report and Written Opinion dated Jun. 18, 2019 for International Application No. PCT/US2019/025185, 11 pages.

International Preliminary Report on Patentability dated Oct. 15, 2020 for International Application No. PCT/US2019/025185, 7 pages.

Notice of Allowance dated May 5, 2020 for U.S. Appl. No. 16/368,806, 8 pages.

International Search Report and Written Opinion dated Jun. 18, 2019 for International Application No. PCT/US2019/022472, 13 pages.

(56) References Cited

OTHER PUBLICATIONS

International Preliminary Report on Patentability dated Oct. 15, 2020 for International Application No. PCT/US2019/022472, 8 pages.
English Translation of Chinese Office Action dated May 21, 2021 for CN Application No. 20198029685.3, 15 pages.
Non-Final Office Action dated Jun. 22, 2020 for U.S. Appl. No. 16/373,558, 6 pages.
Notice of Allowance dated Sep. 17, 2020 for U.S. Appl. No. 16/373,558, 9 pages.
International Search Report and Written Opinion dated Sep. 20, 2019 for International Application No. PCT/US2019/026611, 26 pages.
First Action Interview Pilot Program Pre-Interview Communication dated May 21, 2020 for U.S. Appl. No. 16/380,831, 4 pages.
First Action Interview Office Action dated Sep. 2, 2020 for U.S. Appl. No. 16/380,831, 4 pages.
International Search Report and Written Opinion dated Aug. 1, 2019 for International Application No. PCT/JS2019/020935, 23 pages.
Extended European Search Report dated May 21, 2021 for EP Application No. EP 21169156.3, 9 pages.
International Search Report and Written Opinion dated Oct. 7, 2019 for International Application No. PCT/US2019/025400, 13 pages.
Bernier, Yahn W., "Latency Compensating Methods in Client/Server In-game Protocol Design and Optimization", Same Developers Conference Proceedings, Mar. 20, 2001, 13 pages.
Herrscher et al., "A Dynamic Network Scenario Emulation Tool", Proceedings of the IEEE Eleventh International Conference on Computer Communications and Networks, Oct. 16, 2002; pp. 262-267.
IT Media News, "Google launches new "Chromecast" and "Chromecast Audio" in Japan for JPY4,980"], Feb. 18, 2016, search date Apr. 30, 2021, URL https://www.itmedia.co.jp/news/articles/1602/18/news101.html.
Noble et al., "Trace-Based Mobile Network Emulation", Proceedings of the ACM SIGCOMM'97 Conference on Applications, Technologies, Architectures, and Protocols for Computer Communication; Oct. 1, 1997; pp. 51-61.
Ra-Qin, "Ra-Qin Review of the Activision Decathlon—Gamespot," Sep. 2, 2006; XP055625157; retrieved from www.gamespot.com/the-activision-decathlon/user-reviews/2200-128501/ on Sep. 23, 2019; 3 pages.
Slivar, Ivan et al., "Empirical QoE Study of In-Home Streaming of Online Games", 2014 13th Annual Workshop on Network and Systems Support for Games, IEEE, Dec. 4, 2014, 6 pages.
Weekly ASCII, "Angry Birds Friends, a smartphone game to compete for high score with Facebook friends", May 31, 2013, URL https://weekly.ascii.jp/elem/000/002/615/2615748/.
Yoneda, Satoshi, "Completed Understanding of Windows 8 as a Game Environment (6) Windows Store App Version Game and Xbox Smart Glass," Oct. 30, 2012; 22 pages; accessed on Aug. 5, 2020 from https://www.4gamer.net/games/126/G012689/20121029010/.
Non-Final Office Action dated Mar. 21, 2022 for U.S. Appl. No. 16/844,937, 7 pages.
Notice of Allowance dated Mar. 22, 2022 for U.S. Appl. No. 17/123,523, 9 pages.
Final Office Action dated Nov. 26, 2021 for U.S. Appl. No. 16/566,607, 18 pages.
English Translation of Chinese Office Action dated Oct. 18, 2021, 10 pages.
Non-Final Office Action dated Nov. 29, 2021 for U.S. Appl. No. 17/123,523, 7 pages.
English Translation of Korean Notice of Allowance dated Nov. 5, 2021 for KR Application No. 10-2020-7015094, 3 pages.
Notice of Allowance dated Feb. 14, 2022 for U.S. Appl. No. 16/566,607, 11 pages.
Malfatti, Silvano Maneck et al., "Using Mobile Phones to Control Desktop Multiplayer Games," 2010 Brazilian Symposium on Games and Digital Entertainment, IEEE Computer Society; Nov. 8, 2010; pp. 230-238.
Veljkovic, Nikola et al., "TV-Centric Multiplayer Gaming over the Cloud for Consumer Electronic Devices," 2013 IEEE Third International Conference on Consumer Electronics, Berlin; Sep. 1, 2013; pp. 1-3.
Korean Office Action dated Apr. 14, 2022 for KR Application No. 10-2020-7030955, 19 pages.
Final Office Action dated Jun. 29, 2022 for U.S. Appl. No. 16/844,937, 9 pages.
European Office Action dated Jun. 14, 2022 for EP Application No. 21175400.7, 7 pages.
Non-Final Office Action dated Oct. 26, 2022 for U.S. Appl. No. 17/402,761 , 21 pages.
Translation of Chinese Office Action dated Nov. 17, 2022 for Chinese Application No. 201880033465.3, 24 pages.
Extended European Search Report dated Dec. 16, 2022 for European Application No. 22202122.2, 10 pages.
Non-Final Office Action dated Nov. 1, 2022 for U.S. Appl. No. 17/216,115, 13 pages.
Non-Final Office Action dated Dec. 8, 2022 for U.S. Appl. No. 17/521,133, 6 pages.
Non-Final Office Action dated Oct. 6, 2022 for U.S. Appl. No. 16/844,937, 9 pages.
Notice of Allowance dated Sep. 14, 2022 for U.S. Appl. No. 17/223,226, 62 pages.
English Translation of Korean Office Action dated Mar. 3, 2022 for KR Application No. 10-2022-702303, 8 pages.

* cited by examiner

SHADOW TRACKING OF REAL-TIME INTERACTIVE SIMULATIONS FOR COMPLEX SYSTEM ANALYSIS

CROSS-REFERENCE TO RELATED APPLICATIONS

The present application is a U.S. National Stage application under 35 U.S.C. § 371 of International Patent Application Serial No. PCT/US2019/061407, entitled "SHADOW TRACKING OF REAL-TIME INTERACTIVE SIMULATIONS FOR COMPLEX SYSTEM ANALYSIS" and filed on Nov. 14, 2019, which claims priority to U.S. Provisional Application No. 62/768,780, entitled "SHADOW TRACKING OF REAL-TIME INTERACTIVE SIMULATIONS FOR COMPLEX SYSTEM ANALYSIS" and filed on Nov. 16, 2018, the entireties of which are incorporated by reference herein.

TECHNICAL FIELD

This application relates generally to computer technology, including but not limited to methods and systems for preserving one or more pre-error states in the course of processing real time user-interactive applications.

BACKGROUND

Real time interactive applications are difficult to troubleshoot if they enter an anomalous or failed state. Failures may result in crash dumps and logs that, in some circumstances, indicate code paths that were executed. But developers seeking to understand the set of inputs or stimuli resulting in the application entering an anomalous or failed state do not have many tools at their disposal. Thus, there is a need for systems that provide more detailed and useful information about the state of an application before it fails.

SUMMARY

Implementations described in this specification are directed to providing a processing system to enable a time-delayed version of a primary instance of a real time interactive application. The time-delayed version operates with the same inputs as the primary instance, but operates at a configurable delay behind the primary instance. In the event the primary instance enters an undesired state, this allows the time-delayed instance to be paused prior to occurrence of the undesired state, enabling inspection, stepping, and other diagnostic functions.

In one aspect, some implementations include a method of preserving a pre-error state of a processing unit is implemented at a computer system having one or more processors and memory storing one or more programs for execution by the one or more processors. The method includes receiving a first stream of inputs; buffering the first stream of inputs to generate a buffered stream of inputs identical to the first stream of inputs; conveying the first stream to a primary instance of a first program; conveying the buffered stream to a secondary instance of the first program; executing the primary instance on the first stream in real time; executing the secondary instance on the buffered stream with a predefined time delay with respect to execution of the primary instance on the first stream; detecting an error state resulting from execution of the primary instance; and in response to detecting the error state, pausing the secondary instance and preserving a current state of the secondary instance, wherein the current state of the secondary instance corresponds to a pre-error state of the primary instance.

In some implementations, the error state results from execution of the primary instance on a first input of the first stream (e.g., the first input causes the error state), and the method includes pausing the secondary instance prior to processing an input of the buffered stream corresponding to the first input of the first stream (e.g., pausing the secondary instance before the secondary instance has a chance to process the equivalent of the first input, thereby preventing the error state from occurring in the secondary instance).

In some implementations, the secondary instance, after the predefined time delay, runs concurrently with the primary instance. In some implementations, the secondary instance runs subsequent to termination of the primary instance (e.g., as a result of a fault).

In some implementations, the error state obscures an aspect of the pre-error state of the primary instance; and preserving the current state of the secondary instance includes recording an aspect of the current state of the secondary instance, the aspect of the current state of the secondary instance corresponding with the aspect of the pre-error state of the primary instance, thereby preserving an aspect of the pre-error state that would have otherwise been hidden had the instance not been paused in time. In some implementations, the aspect of the pre-error state of the primary instance is first stored data associated with the primary instance, the aspect of the current state of the secondary instance is second stored data associated with the secondary instance, and the second stored data corresponds with the first stored data, thereby allowing data to be preserved that would otherwise have been lost, or unreadable, in the event of a fault.

In some implementations, executing the primary instance includes generating a first output stream using a first processing unit; and executing the secondary instance includes generating a second output stream using a second processing unit. In some implementations, detecting an error state includes detecting, in the first output stream, an indicator of an error state (e.g., faulty data, a flag, a lack of expected data, and so forth). In some implementations, detecting an error state includes detecting an error state from an indicator (e.g., a fault signal) generated by the first processing unit.

In some implementations, the method further includes, after preserving the current state of the secondary instance, (i) resuming the secondary instance to obtain a subsequent state of the secondary instance, and (ii) preserving the subsequent state of the secondary instance, the subsequent state of the secondary instance corresponding to a subsequent pre-error state of the primary instance, thereby allowing for preservation of states that are closer to the fault state and, as a result, provide more relevant data concerning potential causes of the fault before the fault occurs. In some implementations, pausing the secondary instance comprises ceasing to convey the buffered stream to the secondary instance, and resuming the secondary instance comprises conveying a single input from the buffered stream to the secondary instance, thereby allowing for a more controllable approach to the impending fault, which, as a result, leads to greater data accessibility.

In some implementations, preserving the current state of the secondary instance comprises providing the current state of the secondary instance for inspection (e.g., by a troubleshooting program or programmer).

In some implementations, some operations or subsets of operations described above may be combined and/or the order of some operations or subsets of operations may be changed.

In accordance with some aspects of this application, a computer system includes memory storing instructions for causing the computer system to perform any of the operations described above.

Further, in accordance with some aspects of this application, instructions stored in memory of a computer system include instructions for causing the computer system to perform any of the operations described above.

Other embodiments and advantages may be apparent to those skilled in the art in light of the descriptions and drawings in this specification.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the drawings.

DESCRIPTION OF IMPLEMENTATIONS

Figure 1:
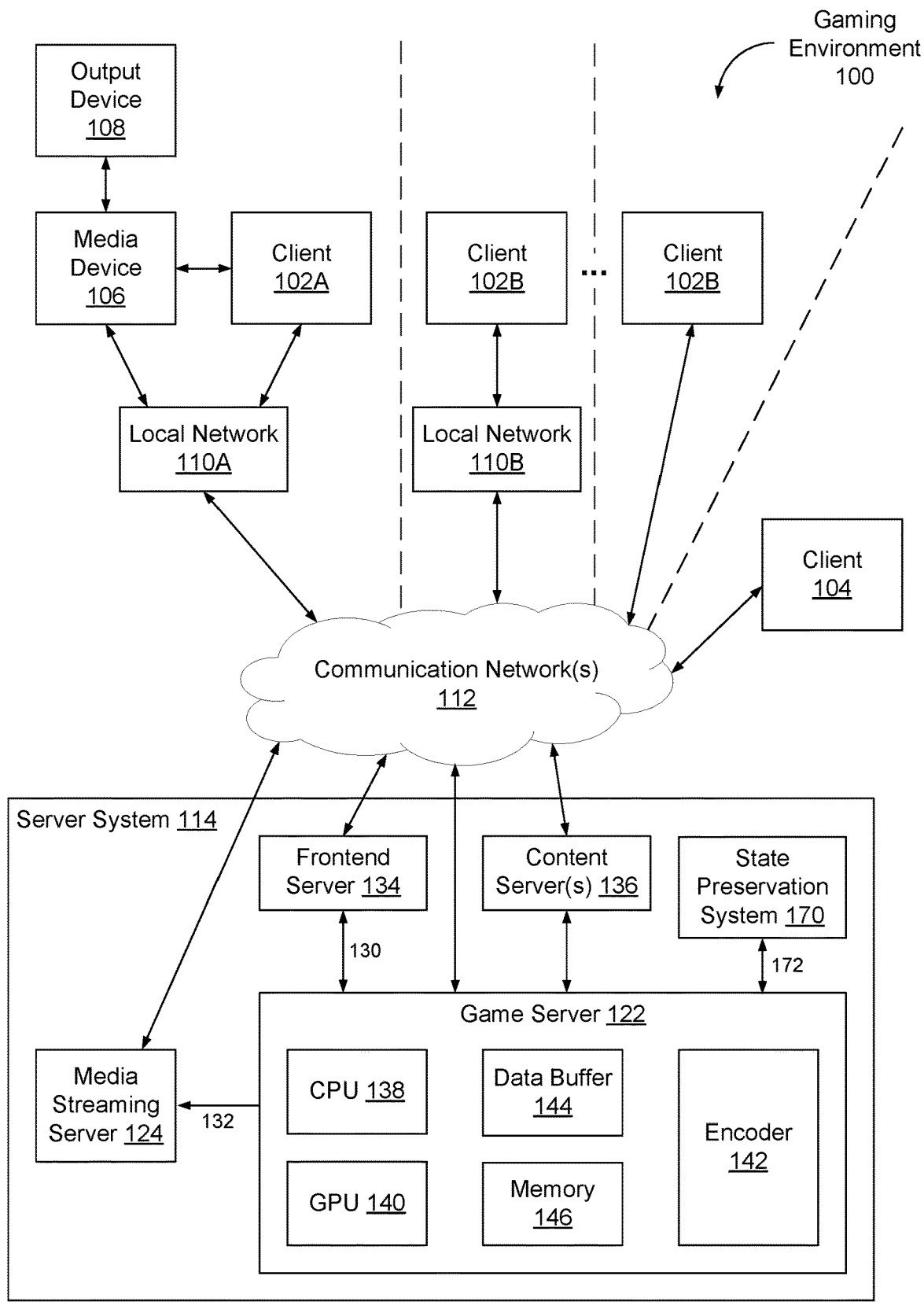
FIG. 1 is an example online interactive gaming environment in accordance with some implementations.

Implementations described in this specification are directed to providing a processing environment to enable a time-delayed version of a primary instance of a real time interactive application. The time-delayed version (also referred to herein as a "shadow process") operates with the same inputs as the primary instance, but operates at a configurable delay with respect to the primary instance. In the event the primary instance enters an undesired state, the time-delayed instance is paused prior to the undesired state occurring, enabling inspection, stepping, and other diagnostic functions.

Example Gaming Environment

To provide more context for some of the implementations described herein, an example gaming environment is now described. Implementations of the example gaming environment described in this section are directed to providing a cloud platform and an API to enable efficient, portable, low latency hosting of cloud gaming content, including third party gaming content. Some implementations dynamically allocate cloud gaming hardware resources (e.g., CPUs, GPUs, memory, input/output, and video stream encoders) and monitor and utilize network bandwidth available to individual end users to provide an optimal online gaming experience concurrently to a community of game players. Some implementations provide multiple performance tiers, including a tier that supports high performance, real-time gaming sessions with high definition media streams for end users. Some implementations support different subscription models and/or are configured to provide one or more concurrent real time gameplay and/or review media streams that correspond with little or no latency to one or more actual gaming streams (e.g., a video stream output to a client device of a user participating in an online/cloud gaming session via either a mobile application or a browser-based program). In some implementations, the real-time gameplay and/or review media streams are provided with little or no latency via a media streaming site, such as YouTube, to one or more users.

In some implementations of a cloud gaming environment, a server system provides hardware resources for a real-time, interactive gaming session for processing player inputs and generating output streams for display to one or more players and, optionally, gaming spectators. In response to a request to establish the real-time interactive gaming session, the server system determines a device capability (e.g., hardware and/or software capabilities) of the requesting client device (i.e., the player's controller device), a connection capability (e.g., bandwidth, latency and/or error rate) of a network connection, and one or more target quality parameters of the gaming session (e.g., resolution of the output video stream(s), gaming response latency, etc.), and accordingly, associates one of its virtual machines with the real-time interactive session for establishing the session.

In some implementations, processing and encoding capability of gaming data (e.g., to produce output video streams for players and/or spectators) are managed for one or more processing cores (e.g., GPU cores and encoder cores) in the server system that hosts the real-time, online, and interactive gaming environment. For example, in some implementations, the one or more processing cores operate with a plurality of processing slices (e.g., each executing on a core for 16.67 ms), and the server system allocates each of the plurality of processing slices to a subset of a plurality of online gaming sessions to be executed thereon. For one of the processing slices, the server system determines a time-sharing processing schedule, such that a corresponding subset of gaming sessions share a duty cycle of the processing slice, and are executed in parallel according to their respective real-time data processing need. Additionally, to expedite image encoding within a time interval, an encoder of the server system does not need to wait until a GPU has made available all data of an image frame. Rather, in some implementations, a portion of an image frame is encoded as soon as information required for encoding the portion is provided by the GPU, independently of whether other portions of the image frame that are irrelevant to the encoded portion are made available or not by the GPU.

In addition, the server system can dynamically generate a number of frames in response to a user command received from a user who plays an online gaming session. In accordance with a type of the user command, the server system determines an expected response latency, actual communication and processing latencies, and an actual transmission latency. Then, the user command is executed in the online gaming session by generating a set of frames reflecting an effect of the command. The set of frames when transmitted at a predefined frame rate occupy a transmission time corresponding to the actual transmission latency, and can be received at a client device of the user within a time corresponding to the expected response latency.

FIG. 1 is an example online interactive gaming environment 100 in accordance with some implementations. The online interactive gaming environment 100 includes one or more client devices (e.g., client devices 102 and 104). Each of the client devices 102 executes one or more game applications. A game session can be run on a specific game application to allow a user of the client device 102 to play an online interactive game hosted by a server system 114. In some implementations, the client device 102 (e.g., a host client) is configured to invite one or more other client devices 102 to join a game scene of the specific game application. Gaming sessions of these client devices 102 are synchronized to display the same game scene, optionally with distinct perspectives corresponding to their respective users.

Conversely, the server system 114 hosts an online interactive game platform to support the client devices 102 to play the one or more game applications including the specific game application. Specifically, the server system 114 includes a plurality of user accounts associated with the client devices 102, and authenticates the users of the client devices in association with each of the one or more game applications. The server system 114 renders and refreshes a scene of the online interactive game on the client devices 102 that join corresponding gaming sessions associated with the scene. In some implementations, the server system 114 assesses the capabilities of the client devices 102 and/or a quality of the communicative connection between the server system 114 and each of the client devices 102, and adaptively generates synchronous data streams for the gaming sessions associated with the client devices 102. By these means, the server system 114 is configured to facilitate synchronous gaming sessions of an online interactive game on two or more client devices 102 simultaneously and with substantially low latencies.

In some implementations, the server system 114 includes a game server 122 and a media streaming server 124. The game server 122 is configured to provide two or more media streams concurrently for an online interactive game session running on a first client device 102A. The two or more media streams include a low latency stream and a normal latency stream that are provided to the first client device 102A and a reviewer client device 104 via one or more communication network 112, respectively. Optionally, the normal latency stream is provided for instructional purposes. While a user of the first client device 102 plays the game session on the first client device 102A, the game session is recorded and broadcast to one or more spectators via the normal latency stream, i.e., the spectators can review the game session on the reviewer client device 104. The low latency stream corresponds to gameplay of the online interactive game session, and has a faster response rate and lower transmission latency than the normal latency stream that corresponds to an associated review session. For example, the low latency stream has a predefined frame rate of 60 frames per second (fps), and provides at least one frame to the first client device 102A during each time interval of 16.67 ms, and the normal latency stream has a predefined frame rate of 30 fps, and provides at least one frame to the reviewer client device 104 during each time interval of 33.33 ms. In some implementations, the normal latency stream has a lower resolution than that of the low latency stream.

In some implementations, a client device 102 or 104 has a display screen integrated therein for displaying media content. In some implementations, a client device 102 or 104 is coupled to a media device 106 and an output device 108. Specifically, the client device 102 or 104 can be communicatively coupled to the media device 106 directly (e.g., via Bluetooth or other wireless communication links), via a local network 110 (e.g., a Wi-Fi network), or via one or more communication networks 112. In some implementations, the client device (102 or 104) and the media device 106 are local to each other (e.g., in the same room, in the same house, etc.). The media device 106 is further coupled to one or more output devices 108 that can output visual and/or audio content (e.g., a television, a display monitor, a sound system, speakers, etc.). The media device 106 is configured to output content to the output device(s) 108. In some implementations, the media device 106 is a casting device (e.g., CHROMECAST by Google Inc.) or a device that otherwise includes casting functionality.

In some implementations, one or more client devices 102 or 104 are capable of data communication and information sharing with each other, a central server or cloud-computing system (e.g., the server system 114), and/or other devices (e.g., another client device 102 or 104, a media device 106 and an output device 108) that are network-connected. Data communication may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document. In some embodiments, the online interactive gaming environment 100 includes a conventional network device (e.g., a router) via which a set of client devices 102 and 104 and their corresponding media and output devices (if any) are communicatively coupled to each other on a local network 110 (e.g., a local area network), and the local network 110 is communicatively coupled to communication networks 112 (e.g., wide-area networks and the Internet). In some embodiments, each of the client devices 102 and 104 optionally communicates with one or more other client devices, a respective media device 106, or a respective output device 108 using one or more radio communication networks (e.g., ZigBee, Z-Wave, Insteon, Bluetooth, Wi-Fi, and/or other radio communication networks).

In some implementations, the client devices 102 are remote from each other, i.e., they are not located in the same room or even structure. A game may be started by launching a game application (e.g., game application 228, FIG. 2) for execution at each client device 102. In some implementations, for each client device 102, the game application establishes an online gaming session 116 with the server system 114 independently. The online gaming sessions 116 of two or more client devices 102 (e.g., 102A and 102B) are related to each other (e.g., because they are played in the same game domain of the game application), and therefore, share a game scene in the game application. The related online gaming sessions 116 are synchronized with each other, and each online gaming session 116 optionally shows the same game scene with a unique player perspective corresponding to the respective client device 102. A user of each client device 102 can therefore play the game on the respective client device and influence the output from the online gaming sessions 116 on the other client device(s) 102.

Alternatively, in some other implementations, after the game application of a first client device 102A establishes an online gaming session 116, one or more second client devices 102B are invited to join the online gaming session 116 by an invitation message, and for example, a message with the link (e.g., a URL address) to join the online gaming session 116 is sent to each of the second client devices 102B. An appropriate controller configuration is provided to each second client device 102B that is invited to join the online gaming session 116. In this application, when the second clients 102B join an online gaming session 116, the server system 114 creates a separate gaming session 116 for each individual second client device 102B. Each separate gaming session 116 of the respective second client device 102B is synchronized with and shares the same scene with the gaming session 116 of the first client device 102A, but can have a unique player perspective corresponding to the respective second client device 102B. After each second client device 102B has received the appropriate controller configuration and joined the online gaming session 116 (more accurately, started its related online gaming session 116), a user can play the game on the respective second client device 102B and influence the output of the online gaming sessions 116 running on the other client device(s) 102.

The client device 102 is a device that includes, and can run, one or more distinct user applications including the game application. In some implementations, the client device 102 is a smartphone, a tablet device, a laptop computer, a desktop computer, or a multimedia device. In some implementations, the client device 102 is a dedicated game controller including game controls (e.g., one or more buttons, joysticks, touch-screen affordances, motion controls, pressure controls, vision controls, audio controls, and/or other haptic interfaces) configured to control certain aspects of gameplay when activated or otherwise manipulated. In some implementations, the client device 102 includes one or more user applications that are configured to operate in conjunction with the media device 106. In some implementations, the applications include a media device application for pairing the client device 102 with the media device 106 and configuring the media device 106. The applications also include one or more applications that can cast associated content to the media device 106. In some implementations, an application casts data and/or content to the media device 106 by sending the data/content directly to the media device 106 (e.g., via the local network) and/or by directing the media device 106 to a remote location (e.g., a URL or other link to a location at a server system) from which the media device 106 can stream or otherwise receive data/content. The media device 106 receives data/content from the application and/or the remote location and outputs visual and/or audio content corresponding to the received data/content to the output device 108. Thus, an online gaming session 116 is established between the game application running on the client device 102, the remote server system 114, and the media device 106.

In some implementations, as part of the process of linking related online game sessions 116, the server system 114 assesses the capabilities of each corresponding client device 102 and/or a quality of the communicative connection between the server system 114 and the client device 102. In some implementations, the server system 114 measures network latency between the client device 102 and the server system 114. If the measured latency is above a threshold and a lower-latency connection is available, the server system 114 can suggest that the client device 102 change to the lower latency connection, or invite a user of the client device 102 to change the client device 102 to the lower latency connection. For example, if the client device 102 is on a cellular wireless connection 118, and a local network is available, the server system 114 can suggest that the client device 102 should connect through the available local network. In some implementations, the latency threshold requirements differ between games. For example, some games (e.g., action games) are best experienced on lower latency connections, and some other games (e.g., online board games or card games) are not as demanding with respect to latency. The server system 114 may make connection recommendations in view of these different requirements associated with different types of games.

In some implementations, as part of the client device 102 starting or joining the gaming session 116, the server system 114 communicates with the client device 102 to set up a controller (e.g., a gaming controller configuration and/or interface) on the client device 102. In some implementations, this includes the server system 114 assessing whether the client device 102 has the needed resources and communication capability for the controller. Depending on available resources at the client device 102, connection quality, and requirements for the game, the controller may be implemented differently at the client device 102. In some implementations, a game can be played with a webpage-based controller interface. For example, a controller interface for the game may be embedded in a webpage, and the webpage is rendered in a web browser on the client device 102. Alternatively, in some implementations, a standardized controller is implemented in a predefined application not specific to the game or directly associated with the game (e.g., a casting device application, such as CHROMECAST or GOOGLE CAST by Google Inc., or other media device application), or in the operating system of the client device 102. For example, the device operating system or a predefined application on the client device 102 may have a controller sub-module. The controller sub-module includes one or more standardized controller configurations, templates, or the like. Each of the standardized controller configurations configures the controller sub-module to utilize input devices and/or sensors on the client device 102 in some way to implement a virtual controller. The standardized controller configuration is used may vary with the game and/or with the type of client device.

Further, in some implementations, a game has a specific controller configuration that may be implemented on the controller sub-module. Such a configuration may be stored at the server system 114 and transmitted to the client devices 102, as part of the process of the client devices 102 joining or starting the online gaming session 116. In some implementations, a specific controller configuration can be an entirely custom controller or a mix of standard controller and a custom controller. Additionally, in some implementations, a game requires a specific application associated with the game. For example, a game may require a controller application associated specifically with the game. In some implementations, the client device 102 may be directed to download the specific application or the predefined application as part of starting or joining the session 116. For example, if the client device 102 does not already have the predefined application (with the controller sub-module) or the specific application associated with game, and such an application is required for play, the server system 114 instructs the client device 102 to prompt its user that a download is needed and to ask the user for permission to proceed.

In some implementations, the server system 114 stores user information associated with user accounts of each of one or more game applications (e.g., game application 228, FIG. 2) that are hosted on the server system 114. Examples of the user information include, but are not limited to, user account information (e.g., identification and passwords), membership type, preference, and activity history. In some implementations, the server system 114 stores session data associated with the online gaming sessions that are played on the client devices 102. Examples of the session data for each online gaming session 116 include, but are not limited to, a frame rate, a rendering specification, a normal latency requirement, information of GPU allocation, information of encoder allocation, identifications of related sessions, and latest status information.

In some implementations, the server system 114 provides a gaming API and cloud platform to enable efficient, portable, low latency hosting of third party gaming content used in the online gaming session 116. In some implementations, the gaming API and cloud platform are enabled by a server system 114 that further includes one or more of: a frontend server 134, a media streaming server 124, a game server 122, and one or more third party content servers 136. In some implementations, the gaming API platform is created by and/or hosted by the game server 122 and enables the gaming session 116 in conjunction with a frontend server 134 and content server(s) 136. The frontend server 134 is configured to provide service to a user of the gaming session 116, and to manage accounts for users. Optionally, users subscribe to a gaming service via the frontend server 134. The content servers 136 provide gaming content related to the gaming session 116.

In some implementations, the frontend server 134 manages user accounts associated with the client devices 102 and 104, e.g., subscriptions to membership of one or more online interactive games by a user account. After the client devices 102 log onto their respective user accounts and join their online gaming sessions 116, the game server 122 sets up the game sessions 116, and manages each specific gaming session 116 for a respective client device 102 by obtaining game contents from the content servers 136, sending the game contents to the game applications executed on the client devices 102, identifying user requests or actions, rendering gameplay outputs for the client devices 102 in response to the user requests or actions, and storing game state data during the respective gaming session 116. The game server 122 includes one or more processing units (e.g., CPU(s) 138, GPU(s) 140 and encoder 142), memory 146, and a data buffer 144 that temporarily stores multimedia content generated by the GPU 140 and provides the multimedia content to the encoder 142 for further encoding (e.g., standardization or compression). The data buffer 144 is optionally integrated in or independent of the memory 146.

In some implementations, the game server 122 dynamically allocates cloud gaming hardware resources (e.g., GPU 140 and encoder 142) and monitors and utilizes network bandwidth available to individual end users to provide an optimal cloud gaming experience. In some implementations, the game server 122 provides multiple performance tiers, including a tier that supports high performance, real-time gaming sessions with high definition video/media streams. In some implementations, the game server 122 supports different subscription models and/or are configured to provide one or more concurrent real-time gameplay and/or review media streams that correspond with little or no latency to one or more actual gaming streams (e.g., a video stream output to a client device of a user participating in an online/cloud gaming session via either a mobile app or a browser-based program). Specifically, the game server 122 is configured to generate concurrent media streams for gameplay and review videos, and the media streaming server 104 is provided with review videos for concurrent gameplay. Such review videos are provided with little or no latency via a media streaming site, such as YouTube, to one or more users. The media streaming site is optionally managed by the media streaming server 124.

Some implementations enable the hosting of public events in conjunction with gaming competitions. For example, in conjunction with a multi-player gaming event or competition based on a hosted game, a cloud gaming site that is hosted by the game server 122 can broadcast or stream to specific reviewer client devices 104, optionally via the media streaming server 123: (a) one or more concurrent ancillary or supplemental media streams, including associated commentary tracks/streams, (b) gaming streams from different competitor points of view, a highlights stream showing particularly compelling gaming action based on cloud server analysis and/or scoring of multiple gaming sessions associated with the gaming event, (c) one or more game point of view streams reflecting gameplay sessions 116 of one or more active gamers, and/or (d) instructional tracks from one or more active gamers and/or commentators, possibly including real-time picture-in-picture (PIP) video sent by the active gamers to the cloud gaming server system 114 along with their corresponding gameplay responses.

In accordance with some implementations, examples of third party content that can be effectively hosted by the content servers 136 include, without limitation, sports games, racing games, role playing games (RPG) and first person shooter (FPS) games. Different instances of these games may have widely varying cloud hardware requirements and network (e.g., to ensure an optimal user gaming experience—consistent in some instances with different subscription performance tiers) based on different associated latency requirements and expectations, output video resolution, and gaming server computational workload and video encoding/streaming resources, and network bandwidth.

In some implementations, the frontend server 134 provides account management APIs and/or software modules that monitor gameplay activity and related requests of subscribers (e.g., requests by end users to invite other players to participate in a gaming session, upgrade their in-game tools, and/or gaming performance) and transmit or make available by APIs associated information to the third party content servers 136 to enable content providers to track settings (including but not limited to billing information, in-game credits, subscription level, etc.) of their subscribers and/or followers. In some implementations, a content provider of hosted content can provide via the same hosting platform one or more different subscription models for the hosted content. In some implementations, a user (e.g., a subscriber to a gaming service) is granted unlimited access and gameplay to all games offered by the content provider on the hosting platform. In some implementations, a user is granted unlimited access and gameplay to one or more specific gaming franchises (e.g., a specific football or first person shooter franchise) offered by the content provider on the hosting platform. In some implementations, the subscriptions are for limited participation by a user—where the participation can be limited based on gameplay time, level of hardware resources committed to the end user, or end user device type/location. In some implementations, the account APIs and modules configure and monitor gameplay sessions, and enable the content providers to track gaming activity of respective subscribers in accordance with their most current subscription information—even during active gameplay.

The server system 114 enables cloud features that allow a user to move around, e.g., suspending a first game stream of a first gaming session executed on a first client device 102, and restarting the first game stream on a second gaming session of a second client device 102 to continue the first game session. The server system 114 also supports multiple players on a massive scale, and provides richer, more persistent cloud-based worlds. The server system 114 uses a cloud-based system to store session data related to different gaming sessions 116 of the same user, or different gaming sessions 116 of different users.

The server system 114 renders gaming content on a plurality of client devices 102 and 104, including but not limited to, mobile phones, tablet computers, desktop computers, and televisions. Optionally, the gaming content is dynamically adjusted to comply with the specifications of these client devices 102 and 104. In some implementations, the client devices 102 and 104 have a limited or no storage capability, because the gaming API platform provides instant access and requires no or little user device storage (e.g., a user can start playing in 5 seconds and save 250 GB of console hard drive space).

In addition to gaming content, the server system 114 also streams to the client devices 102 and 104 add-on content, e.g., new league rosters, statistics, and preview access to early titles, which is optionally updated regularly (e.g., readily updated, upgraded every day or every hour). In some implementations, the add-on content includes a search result of an internet search or a database search.

In some implementations, the server system 114 supports a live online community associated with a game application. Users (e.g., subscribers of a service) participate in live events, tournaments or activities on the corresponding gaming API platform throughout the day. Examples of the live events, tournaments or activities include spectating live gaming sessions played by other users, posting accomplishments to a public domain (e.g., YouTube), and getting live tips and coaching videos. For example, in response to a user action, the game server 122 provides two or more live streams 130 and 132. While keeping a first gaming stream 130 on a first gaming session 116 of the first client device 102A for a game player, the server system 114 also broadcasts a second live review stream 132 (e.g., YouTube streams) to one or more other client devices 104 (e.g., of subscribers). The second live review stream 132 allows the user to share his or her gaming experience with an audience. Optionally, the second live stream is a reproduction of a screen of the first client device 102A of the player. The server system 114 may obtain an audio stream in which the player explains the first gaming session 116, or a video stream of the player playing and explaining the first gaming session 116. The audio stream is optionally played for the audience while the second live review stream 132 is played for the audience. The video stream is optionally played in an embedded window in the second live review stream 132.

Some implementations provide on-the-go gaming, allowing the user to take—to any location or client device—his or her desired games. For example, a user can start an online gaming session 116 on a mobile device 102A on his or her commute, then seamlessly resume the gaming session 116 at his or her destination on a laptop computer 102B. Also, in some implementations, based on the different client device resources available to a user as the gaming session 116 is handed off between different devices 102, the server system 114 (specifically, the game server 122) can dynamically deploy a different set of hardware resources (e.g., GPU 140 and encoder 142) to optimize the user's gaming experience based on the different end user current device resources (e.g., client hardware capability and network bandwidth).

In the server system 114, the frontend server 134 and the game server 122 can have a respective user account system. In an example, the user account system for the frontend server 134 is used to manage subscriptions to specific gaming content and service, and the user account system for the game server 122 (e.g., a YouTube or Google account) is used for managing gaming experience (e.g., rendering gaming content to satisfy specific gaming criteria) and many other purposes. In some implementations, these two user account systems share customer and usage data (e.g., social, friends, presence, authentication, account information, billing information). Also, the content frontend server 134 provides a service layer that sits on top of a technology layer enabled by the game server 122. In some implementations, gaming content server(s) manage additional user account systems for accessing their content. Optionally, the additional user account systems for gaming content are integrated with the user account system for the frontend server 134 that manages user subscriptions.

In some implementations, the server system includes a state preservation system 170 for processing real-time and delayed instances of game applications. Various implementations of the state preservation system 170 are described below with respect to FIGS. 7-10.

Figure 2:
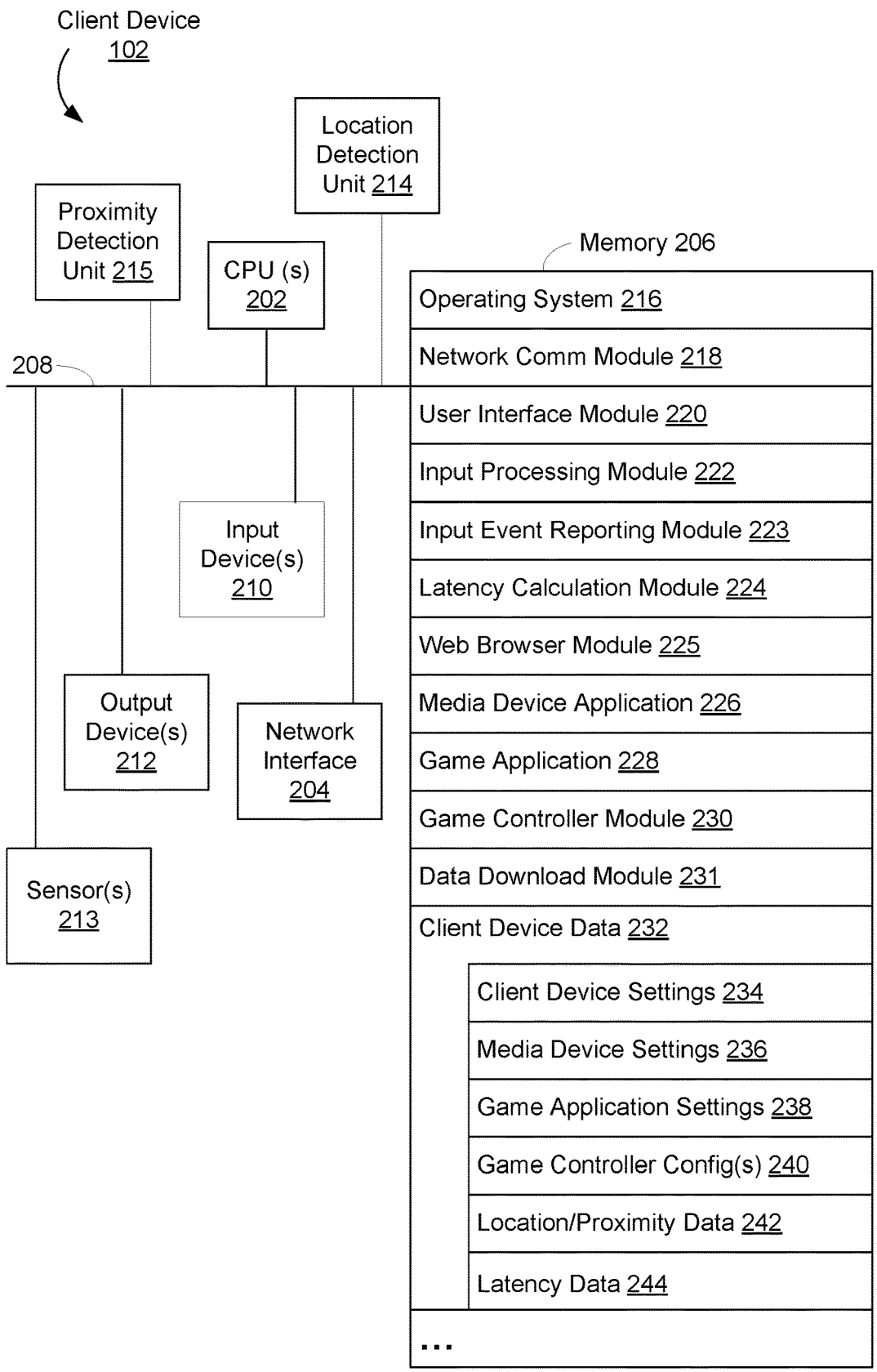
FIG. 2 is a block diagram illustrating an example client device of the gaming environment in accordance with some implementations.

FIG. 2 is a block diagram illustrating an example client device 102 of the gaming environment 100 in accordance with some implementations. Throughout this application, unless specified otherwise, reference to a client device 102 corresponds to one or more of the client devices 102A, 102B, and 104 described with reference to FIG. 1. Examples of the client device 102 include, but are not limited to, a mobile phone, a tablet computer, a laptop computer, a desktop computer, and a wearable personal device. In some implementations, the client device 102 is a dedicated game controller including game control inputs 210 (e.g., one or more buttons, joysticks, touch-screen elements, motion controls, pressure controls, vision controls, audio controls, and/or other haptic interface elements configured to control certain aspects of gameplay when activated). The client device 102 includes one or more processing units (CPUs) 202, one or more network interfaces 204, memory 206, and one or more communication buses 208 for interconnecting these components (sometimes called a chipset). The client device 102 includes one or more input devices 210 that facilitate user input, such as a keyboard, a mouse, a voice-command input unit or microphone, a touch screen display, a touch-sensitive input pad, a gesture capturing camera, or other input buttons or controls. Furthermore, some client devices 102 may use a microphone and voice recognition or a camera and gesture recognition to supplement or replace interfaces requiring contact (e.g., keyboard and buttons). In some implementations, the client device 102 includes one or more cameras, scanners, or photo sensor units for capturing images, for example, of graphic series codes printed on electronic devices. In some implementations, the client device 102 includes one or more output devices 212 that enable presentation of user interfaces and display content, including one or more speakers and/or one or more visual displays. Optionally, the client device 102 includes a location detection device 214, such as a GPS (global positioning satellite) or other geo-location receiver, for determining the location of the client device 102. The client device 102 may also include a proximity detection device 215, e.g., an IR sensor, for determining a proximity of a media device 106 and/or of other client devices 102. The client device 102 may also include one or more sensors 213 (e.g., accelerometer, gyroscope, etc.) for sensing motion, orientation, and other parameters of the client device 102, which may be used as input (e.g., for inputs 210 described above).

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

- Operating system 216 including procedures for handling various basic system services and for performing hardware dependent tasks;
- Network communication module 218 for connecting the client device 102 to other devices (e.g., the server system 114, the media device 106, and other client devices 102) via one or more network interfaces 204 (wired or wireless) and one or more networks 110 and/or 112, such as the Internet, other wide area networks, local area networks, metropolitan area networks, and so on;
- User interface module 220 for enabling presentation of information (e.g., a graphical user interface for presenting applications, widgets, websites and web pages thereof, and/or games, audio and/or video content, text, etc.) at the client device 102 via one or more output devices 212 (e.g., displays, speakers, etc.);
- Input processing module 222 for detecting one or more user inputs or interactions from one of the one or more input devices 210 and interpreting the detected input or interaction;
- Input event reporting module 223 for reporting input identification and/or timestamp information to the server system 114 for use in latency calculations;
- Web browser module 225 for navigating, requesting (e.g., via HTTP), and displaying websites and web pages thereof, including a web interface for joining the session 116;
- Media device application 226 for interacting with a media device 106, including logging into a user account associated with the media device 106, controlling the media device 106 if associated with the user account, and editing and reviewing settings and data associated with the media device 106;
- Game application(s) 228 for providing game(s) on the client device 102, including facilitating corresponding gameplay and facilitating invitation of additional players;
- Game controller module 230 for providing a gameplay input interface to the game application(s) 228;
- Data download module 231 for downloading data (e.g., game controller configurations 456 (FIG. 4), game applications 228 and other applications, updates to modules and applications and data in memory 206) from server system 114 and other content hosts and providers; and
- Client device data 232 storing at least data associated with the game application 228 and other applications/modules, including:
    - Client device settings 234 for storing information associated with the client device 102 itself, including common device settings (e.g., service tier, device model, storage capacity, processing capabilities, communication capabilities, etc.);
    - Media device settings 236 for storing information associated with user accounts of the media device application 226, including one or more of account access information, and information for device settings (e.g., service tier, device model, storage capacity, processing capabilities, communication capabilities, etc.);
    - Game application(s) settings 238 for storing information associated with user accounts of the game application(s) 228, including one or more of account access information, in-game user preferences, gameplay history data, and information on other players;
    - Game controller configuration(s) 240 for storing information associated with configurations (e.g., received configurations from game controller configurations 456, FIG. 4) of game controller module 230 for game application(s) 228; and
    - Location/proximity data 242 including information associated with the presence, proximity or location of any of the client device 102 and the media device 106.

In some implementations, the game controller module 230 is a part (e.g., a sub-module) of the media device application 226 or another application in memory 206. In some implementations, the game controller module 230 is a part of the operating system 216. In some implementations, the game controller module 230 is a distinct module or application.

In some implementations of the client device 102, the media device application 226 (and corresponding media device settings 236) and game application 228 (and corresponding game application settings 238) are optional. Depending on the particular game to which the client device 102 is invited to join, the media device application 226 and the game application 228 are not required to play. If any of these applications are needed for playing the game (e.g., the game uses a game controller module 230 within the media device application 226), and the application is not in memory 206, the client device 102 may be prompted to download the application.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
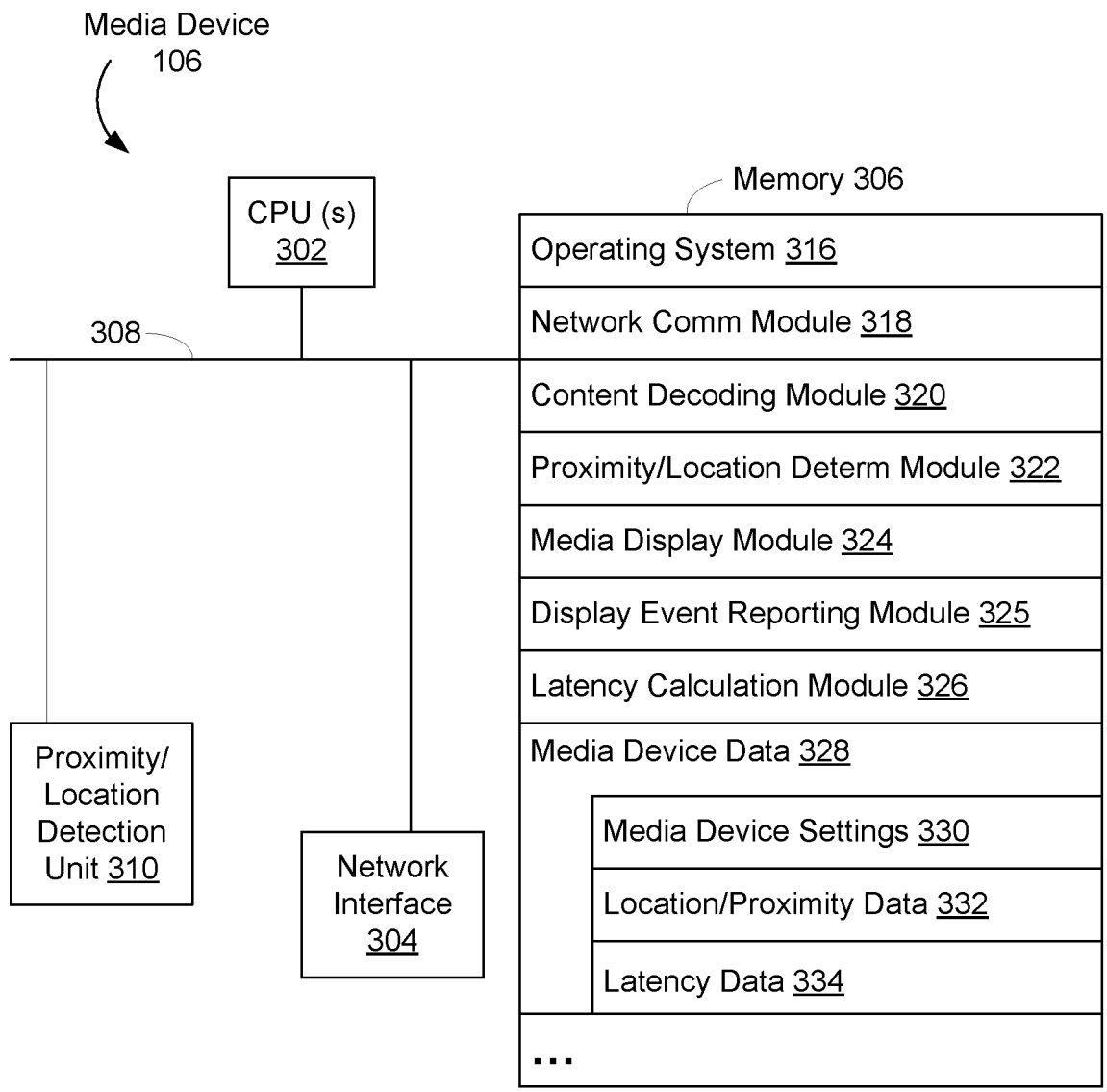
FIG. 3 is a block diagram illustrating an example media device of the gaming environment in accordance with some implementations.

FIG. 3 is a block diagram illustrating an example media device 106 of the gaming environment 100 in accordance with some implementations. The media device 106, typically, includes one or more processing units (CPUs) 302, one or more network interfaces 304, memory 306, and one or more communication buses 308 for interconnecting these components (sometimes called a chipset). Optionally, the media device 106 includes a proximity/location detection unit 310, such as an IR sensor, for determining the proximity of a client device 102.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

- Operating system 316 including procedures for handling various basic system services and for performing hardware dependent tasks;
- Network communication module 318 for connecting the media device 106 to other computers or systems (e.g., the server system 114, and the client device 102) via one or more network interfaces 304 (wired or wireless) and one or more networks 110 and/or 112, such as the Internet, other wide area networks, local area networks, metropolitan area networks, cable television systems, satellite television systems, IPTV systems, and so on;
- Content Decoding Module 320 for decoding content signals received from one or more content sources (e.g., server system 114 for output from the game session 116) and outputting the content in the decoded signals to an output device 108 coupled to the media device 106;
- Proximity/location determination module 322 for determining the proximity of the client device 102 based on proximity related information that is detected by the proximity detection unit 310 or provided by the server system 114;
- Media display module 324 for controlling media display; and
- Display event reporting module 325 for reporting display event identification and/or timestamp information to the server system 114 for use in latency calculations;
- Latency calculation module 326 for calculating latency values based on latency data 334 reported by other components in the gaming environment;
- Media device data 328 storing at least data including:
  - Media device settings 330 for storing information associated with user accounts of a media device application, including one or more of account access information and information for device settings (e.g., service tier, device model, storage capacity, processing capabilities, communication capabilities, etc.);
  - Location/proximity data 332 including information associated with the presence, proximity or location of any of the client devices 102 and the media device 106; and
  - Latency data 334 including information (e.g., timestamps) necessary for the latency calculation module 326 to calculate latency values.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

Figure 4:
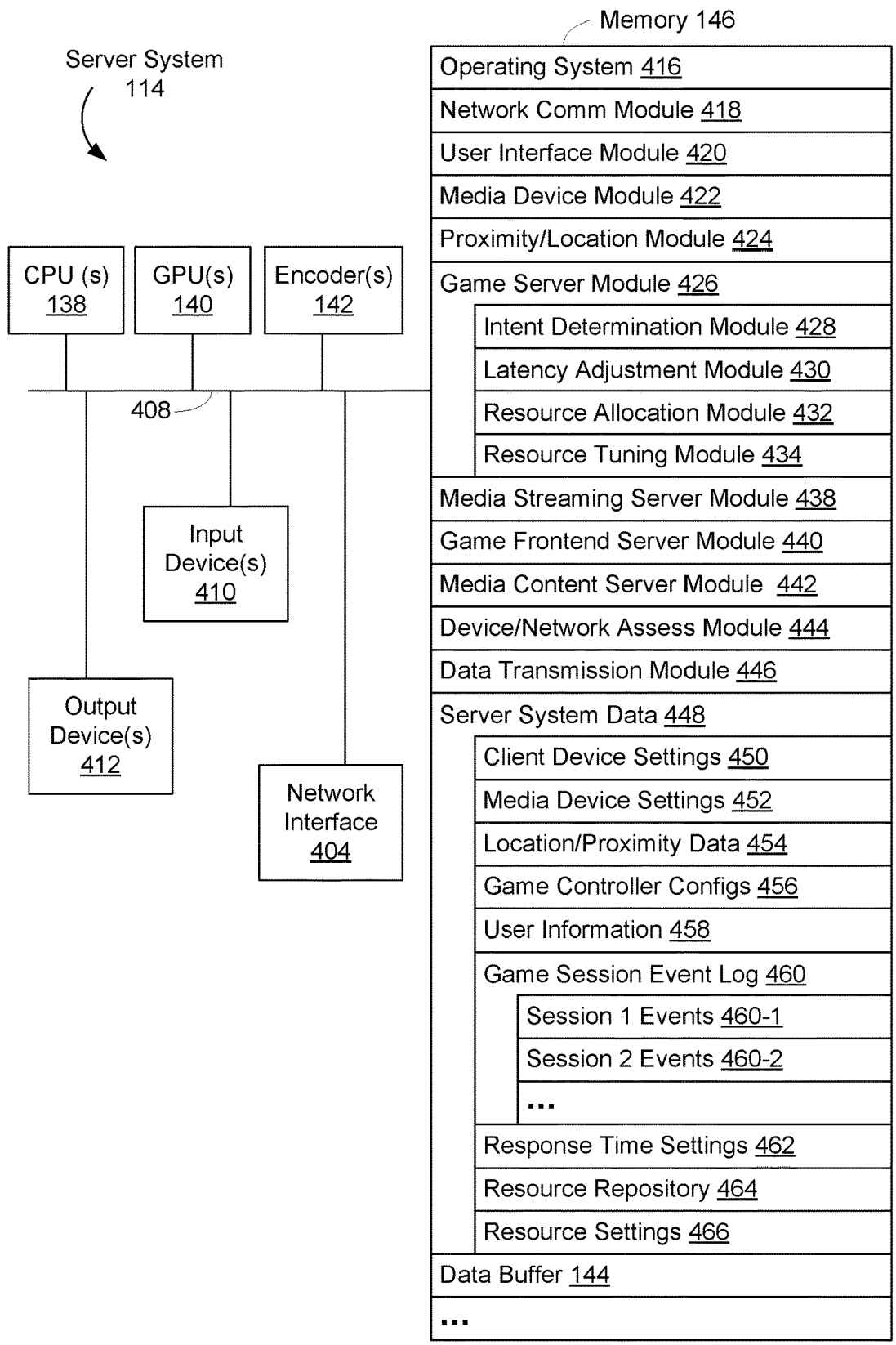
FIG. 4 is a block diagram illustrating an example server of the gaming environment in accordance with some implementations.

FIG. 4 is a block diagram illustrating an example server in the server system 114 of the gaming environment 100 in accordance with some implementations. The server system 114, typically, includes one or more processing units (e.g., CPU(s) 138, GPU(s) 140 and encoder 142), one or more network interfaces 404, memory 146, and one or more communication buses 408 for interconnecting these components (sometimes called a chipset). The server system 114 may optionally include one or more input devices 410 that facilitate user input, such as a keyboard, a mouse, a voice-command input unit or microphone, a touch screen display, a touch-sensitive input pad, a gesture capturing camera, or other input buttons or controls. Furthermore, the server system 114 may use a microphone and voice recognition or a camera and gesture recognition to supplement or replace the keyboard. In some implementations, the server system 114 optionally includes one or more cameras, scanners, or photo sensor units for capturing images, for example, of graphic series codes printed on electronic devices. The server system 114 may also include one or more output devices 412 that enable presentation of user interfaces and display content, including one or more speakers and/or one or more visual displays.

Memory 146 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 146, optionally, includes one or more storage devices remotely located from one or more processing units. Memory 146, or alternatively the non-volatile memory within memory 146, includes a non-transitory computer readable storage medium. In some implementations, memory 146, or the non-transitory computer readable storage medium of memory 146, stores the following programs, modules, and data structures, or a subset or superset thereof:

- Operating system 416 including procedures for handling various basic system services and for performing hardware dependent tasks;
- Network communication module 418 for connecting the server system 114 to other devices (e.g., various servers in the server system 114, client device(s) 102, and media device(s) 106) via one or more network interfaces 404 (wired or wireless) and one or more networks 110 and/or 112, such as the Internet, other wide area networks, local area networks, metropolitan area networks, and so on;
- User interface module 420 for enabling presentation of information (e.g., a graphical user interface for presenting application(s), widgets, websites and web pages thereof, and/or games, audio and/or video content, text, etc.) at client device(s) 102;

A media device module 422 (optional) that is executed to provide server-side functionalities for device provisioning, device control, and user account management associated with media device(s) 106;

Proximity/location determination module 424 for determining the proximity of client device(s) 102 to the media device 106 based on location information of any of the client device 102 and the media device 106;

Game server module 426 for providing server-side functionalities associated with games (e.g., game application(s) 228), including but not limited to setting up game sessions, storing session state data and other game-related data, processing gameplay inputs from client device(s) 102, and rendering gameplay outputs in response to the gameplay inputs;

Media streaming server module 438 for hosting a media streaming site, receiving concurrent ancillary or supplemental media streams associated with an online gaming session, and providing the concurrent media streams to a client device 104 for concurrent display with the online gaming session that is being executed on the game applications 228 of the same client device 104 or a distinct client device 102;

Frontend server module 440 for managing user accounts associated with the client devices 102, e.g., subscriptions to membership of one or more online interactive games by a user account, enabling service to subscribers for forwarding subscriber requests to the game server module 426, and monitoring gameplay activity and related requests of subscribers;

Media content server module 442 for providing access to gaming content hosted by one or more third party content providers;

Device/network assessment module 444 for assessing device and network capabilities of client device(s) 102, including but not limited to assessing network bandwidth of the connection to the client device 102 and assessing whether the client device 102 has the needed module or application to play a game;

Data transmission module 446 for providing data (e.g., game controller configurations 456, software updates, etc.) to client devices 102; and Server system data 448 including:
  Client device settings 450 for storing information associated with the client device(s) 102, including common device settings (e.g., service tier, device model, storage capacity, processing capabilities, communication capabilities, etc.);
  Media device settings 452 (optional) for storing information associated with user accounts of the media device application 422, including one or more of account access information and information for device settings (e.g., service tier, device model, storage capacity, processing capabilities, communication capabilities, etc.);
  Location/proximity data 454 including information associated with the presence, proximity or location of any of the client device 102 and the media device 106;
  Game controller configurations 456 for storing controller configurations for various games;
  User information 458 for storing information associated with user accounts of each of one or more game applications (e.g., game application 228, FIG. 2) that are hosted on the server system 114, including for example user account information (e.g., identification and passwords), membership type, preference, and activity history;
  Game session event log 460 for storing event data associated with game sessions (e.g., game state data, input events, display events, other game-related data), including for example data 460-1 for a first game session and data 460-2 for a second game session, where the session data 460 for each game session includes, but is not limited to a frame rate, a rendering specification, a normal latency requirement, information of GPU allocation, information of encoder allocation, identifications of related sessions, latest status information associated with the respective game session, a log of input events, and a log of display events;
  Response time settings 462 for storing expected latency values for various user command types;
  Resource repository 464 for storing virtual machine resource profiles and container images; and
  Resource settings 466 for storing configurations of available resources based on user tolerance levels; and
Data buffer 144 for temporarily storing gameplay multimedia content generated by the GPU 140 in association with one or more output media streams.

In some implementations, the game server module 426 includes the following programs, modules, or a subset or superset thereof:
  Intent determination module 428 for comparing user input transit times (e.g., between the client device 102 and the server system 114) with display transit times (e.g., between the media device 106 and the server system 114), and determining the user's intent behind particular inputs by matching input events with respective trigger frames;
  Latency adjustment module 430 for determining a number of intermediate frames for the GPU 140 to insert between (i) a current frame being processed at the time a user input is received and (ii) a response frame showing a result of the received input;
  Resource allocation module 432 (optionally referred to herein as a "session orchestrator") for receiving session requests from endpoints (e.g., controllers 102) and determining which resources to assign to the session; and
  Resource tuning module 434 for determining latency tolerances for particular users.

In some implementations, the memory 146 further includes a data buffer 144 configured to couple the encoder 142 to the GPU 140. Specifically, the data buffer 144 temporarily stores gameplay multimedia content generated by the GPU 140 in association with one or more output media streams, such that the encoder 142 can retrieve the gameplay multimedia content from the data buffer 144 and encode the retrieved content to the one or more media streams, e.g., for standardization, speed or compression.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 146, optionally, stores a subset of the modules and data structures identified above. Furthermore, memory 146, optionally, stores additional modules and data structures not described above.

The various implementations of cloud-based gaming platforms described above provide many benefits (e.g., portability, scalability, efficiency, ease of access and control, and so forth). However, the cloud-based nature of these gaming platforms come with various challenges, such as variability in network and processing resources, which may negatively affect the gameplay experience if not proper accounted for. Such challenges can potentially create an uneven gaming experience due to variable latencies introduced in the networks 110/112 between players devices 102 and the server system 114. The following disclosure describes various implementations which detect and compensate for different types of latency that may exist in real-time interactive cloud-based gaming environments. By compensating for these latencies, the implementations described herein provide a smooth and uniform gaming experience for each player, regardless of the network and processing resources available.

Figure 5A:
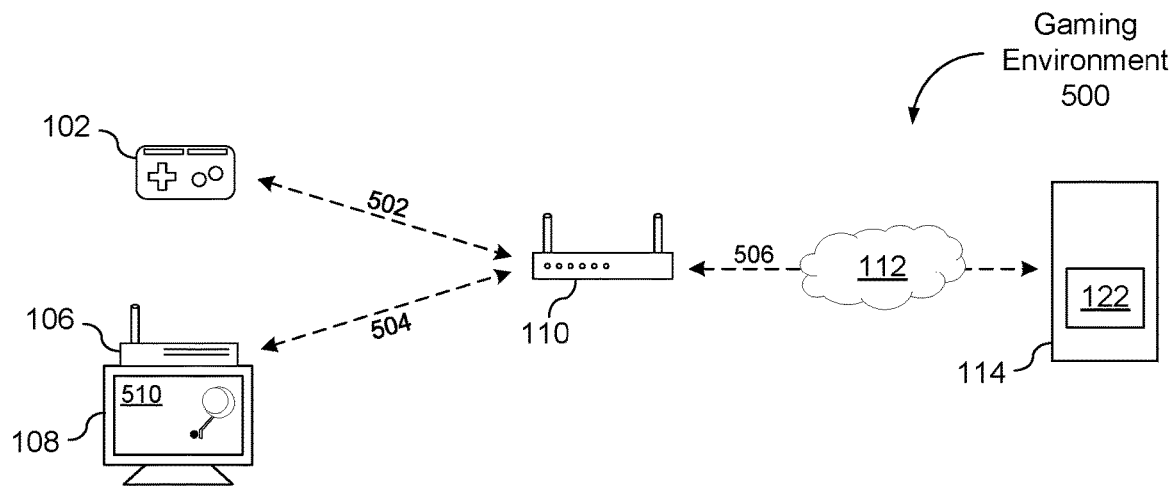
FIG. 5A depicts an example gaming environment in accordance with some implementations.

FIG. 5A depicts an example gaming environment 500, from which several sources of latency will be described. Gaming environment 500 is an example implementation of gaming environment 100 (FIG. 1), with corresponding components similarly labeled. The gaming environment 500 includes a client device 102 (also referred to herein as a "game controller" or "controller"), which a player (or "user") uses to control various aspects of the game (or "gameplay") by, for example, activating or manipulating inputs 210 (FIG. 2). The gaming environment 500 also includes a media device 106 (e.g., a set-top box) and an output device 108 (e.g., a television or other output display). The controller 102 and the media device 106 are communicatively coupled to a local network 110 (depicted, in this example, as a wireless router) via local communication links 502 and 504, respectively (e.g., through WiFi). The local network 110 is communicatively coupled through a communication link 506 to a server system 114 via communication network(s) 112 (e.g., the internet). The server system 114 includes a game server 122 (FIG. 1).

While the gaming environment 500 depicted in the figure only includes a single local network 110 with a single controller 102, some implementations of the gaming environment 500 may include a plurality of local networks 110, with some of the local networks 110 including more than one controller 102 (e.g., for multiplayer games sharing the same gaming session, as described with reference to FIGS. 1-4 above).

Several elements that are present in the gaming environment 500 can introduce latency that is both appreciable (e.g., impacting at least one frame) and time-varying. For instance, the local network 110 (e.g., WiFi) can introduce various amounts of latency in communication links 502 and 504. Average latency can be very low (e.g., <1 ms) if there is no contention on the channel. However, in busy environments such as apartment buildings with overlapping WiFi networks or gameplay environments with multiple wireless client devices, average amounts of latency in the 10-50 ms range are more common, with 200+ ms outliers.

Further, the communication network(s) 112 (e.g., the internet) can introduce latency in communication link 506. This latency may be less highly variable than WiFi for most users; however, in peak gaming hours (early evening), media sharing (e.g. on Cable modems) as well as network saturation can result in delayed or dropped packets. The average latency will depend on distance from the local network 110 to an edge server of the server system 114, with example amounts of latency in the 20-30 ms range.

The network-introduced latencies described above may vary based on the direction of traffic flow (e.g., from controller 102 to server 122, vs. from server 122 to media device 106), due to asymmetry of network demand and link capacity. Accordingly, latency on link 506 from the router to the server may not match latency from the server back to the router, and so forth.

Further, the game server 122 can introduce latency. There is latency from the arrival of an input event at the GPU 140 to the output of a frame from the encoder 142. However, in some implementations, this latency is fully traceable, and as a result, is known by the game server 122.

Lastly, there is latency between arrival of a frame at the output device 108 (e.g., the television) and display of that frame. This can depend on the nature of processing in the output device, including the display mode (e.g. game mode vs. a non-game mode). For example, a televisions may have as little as 15-30 ms of display lag, or as much as 50-60 ms of display lag. A bad television can have 120+ ms of display lag.

Figure 5B:
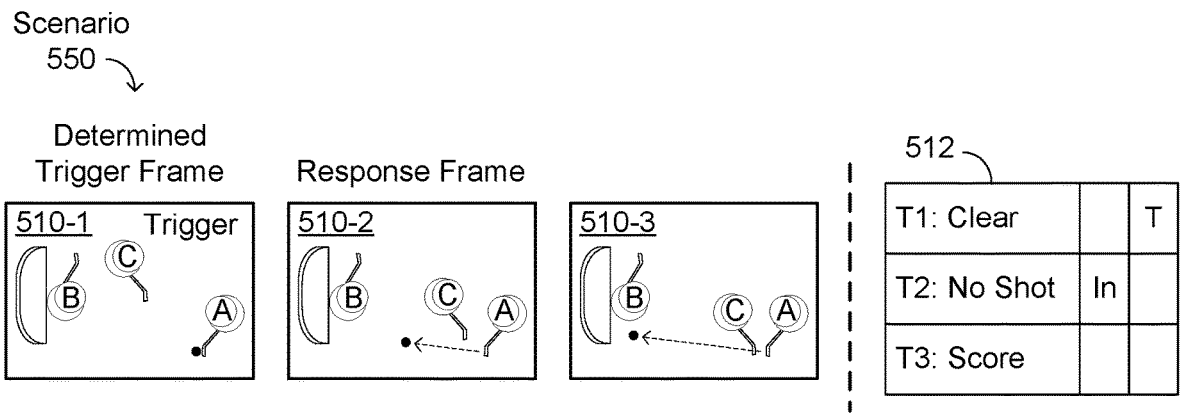
FIGS. 5B and 5C depict example gaming scenarios in accordance with some implementations.
Figure 5C:
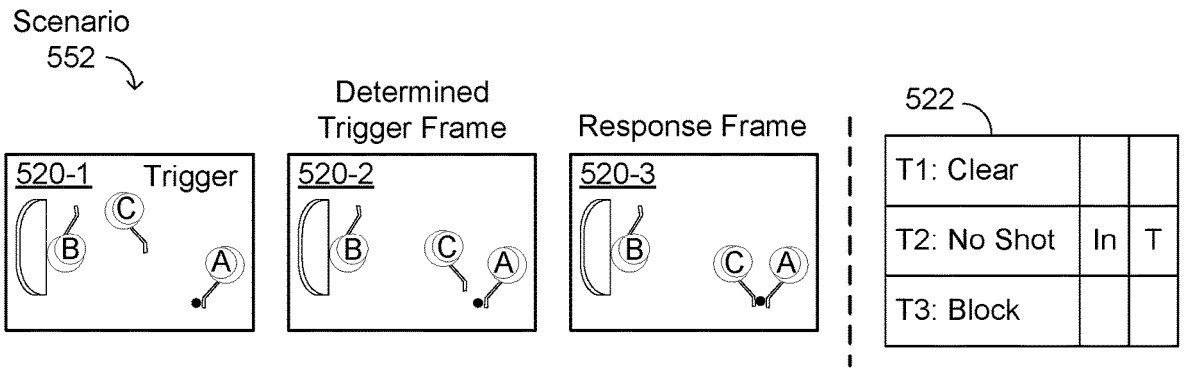

The different types of latency described above may have significant effects on the gameplay experience. FIGS. 5B and 5C show two example gameplay experiences which include the same user input but result in entirely different outputs due to different levels of latency. Before describing these examples in detail, however, it is first necessary to describe an example gameplay process.

Figure 6:
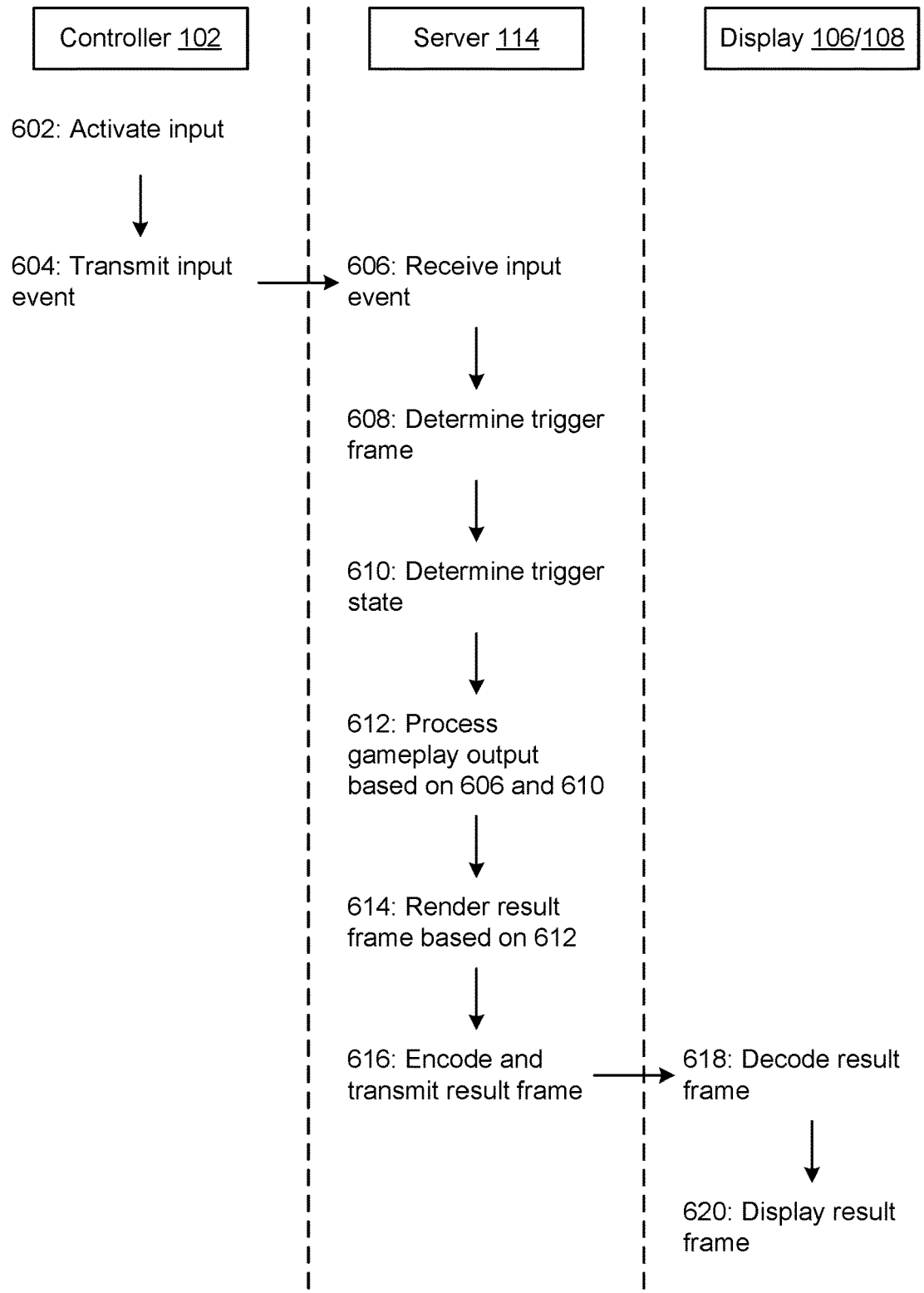
FIG. 6 is a flow diagram of a gameplay process in accordance with some implementations.

FIG. 6 is a flow diagram of a gameplay process 600 in accordance with some implementations. The process may be performed at an electronic server (e.g., server system 114, or more specifically, game server 122) having one or more processors (e.g., CPU 138 and/or GPU 140) and memory (e.g., memory 146) storing one or more programs for execution by the one or more processors; a media device (e.g., media device 106) having one or more processors (e.g., CPU 302) and memory (e.g., memory 306) storing one or more programs for execution by the one or more processors; and/or a user device (e.g., controller 102) having one or more processors (e.g., CPU 202) and memory (e.g., memory 206) storing one or more programs for execution by the one or more processors. In some implementations, the server, media device, and user device include one or more programs and memory storing one or more respective programs for execution by the one or more respective processors, and the one or more programs include instructions for performing the process 600. In some implementations, respective non-transitory computer readable storage media store one or more respective programs, the one or more respective programs including instructions, which, when executed by an electronic server, the media device, and the user device, with one or more respective processors, causes the electronic server, the media device, and the user device to perform the process 600.

A user of controller 102 (also referred to herein as a "player") uses the controller 102 to influence events in the game, which are depicted by video frames (e.g., 510) displayed on the output device 108 (see FIG. 5A). When the player decides to influence gameplay (e.g., by moving a virtual player, shooting a hockey puck, and so forth), the player activates (602) or otherwise manipulates an input 210 on the controller 102 (e.g., presses a button). The activation or manipulation of an input 210 on the controller 102 is sometimes referred to herein as an "input event" or a "command." The input event is communicated (604), via communication links 502 and 506 (over networks 110 and 112) to the server system 114 (e.g., to an event log 460 associated with the game session).

Upon receipt (606) of the input event, the server system 114 (e.g., intent determination module 428 of game server 122) determines (608) which frame was displayed on the output device 108 at the time the user activated the input associated with the received input event. The frame that was displayed to the user at the time the user activated the input is referred to herein as the "trigger frame," because it triggered the user to respond by activating the input. For example, in a hockey game, if a frame displays an open shot, this triggers the player to respond by activating an input control that is mapped to a "shoot puck" function. The trigger frame is the frame 510 showing the open shot (e.g., frame 510-1, FIG. 5B), and the input event is the user's activation of the "shoot puck" control on the controller 102, in response to having seen the trigger frame 510.

Upon determining the trigger frame, the game server 122 (e.g., intent determination module 428) determines (610) the state of the game at the time the trigger frame was displayed to the user (referred to herein as the "trigger state"). In some implementations, the intent determination module 428 determines the trigger state by consulting a log of game states maintained in an event log 460 (FIG. 4). In some implementations, the event log 460 includes a log of game states that is indexed by frame fingerprints, frame IDs, and/or game time data (e.g., timestamps or clock data). In some implementations, the intent determination module 428 determines the trigger state by determining a game time index associated with the trigger frame, and consulting the event log 460 to determine the state of the game that existed at the time of the game time index associated with the trigger frame. Depending on how much time passed between the displaying of the trigger frame on output device 108 and the receiving of the input event at the game server 122, the trigger state may be in the past, relative to a current state being processed at the game server 122.

Going back to the previous example, if the trigger frame (showing an open shot on the goal) is associated with game time index T1, the state of the game at time index T1 includes a virtual shooter, a virtual defender, a virtual puck, a virtual goal, and the location of each of these objects. According to the state of the game at time index T1, or more specifically, the location of each of the aforementioned virtual objects at time index T1, a clear path exists between the puck and the goal. Stated another way, one or more algorithms controlling rules of gameplay would have allowed, at the moment in time during display of the trigger frame (time index T1), a virtual puck to travel from the virtual player shooting the puck to the virtual goal without being stopped by any other virtual players between the shooter and the goal. However, in some scenarios, when an input event (e.g., "shoot puck") arrives at the server, the server is currently processing gameplay at a subsequent state T2, which may include an advanced state of gameplay in which the virtual puck no longer has a clear path to the goal. In these scenarios, if the server correctly determines the trigger state to be T1, then the trigger state is a past state, relative to the state T2 that server is currently processing.

Having determined the trigger state, the game server 122 (e.g., GPU 140) processes (612) a subsequent game state (sometimes referred to herein as a "gameplay output") in accordance with (i) the input event (e.g., "shoot puck"), and (ii) the trigger state (e.g., including a clear path from the puck to the goal). In some implementations, processing a gameplay output comprises inputting the input event into an algorithm or game engine that determines gameplay outputs based on input events and corresponding game states. For example, a game engine may determine the next game state based on the state/location of each player and the puck in relation to the goal during the current game state, as well as any input commands received with respect to the virtual players (e.g., "move," "shoot," or "block") during the current game state. In some implementations, processing the subsequent game state (the gameplay output) in accordance with the input event and the trigger state includes processing the input event as if it had been available to the server at the time the server was processing a game state proximate to the trigger state (e.g., the next state after the trigger state, or a state closely following the trigger state).

Upon processing the gameplay output, the game server 122 renders (614) a frame or a series of frames depicting the processed gameplay output. The frame (or the first of the series of frames) depicting the gameplay output is referred to herein as the "response frame(s)." For example, if the input event and trigger state result in a gameplay output including movement of a particular virtual player, the response frame is a frame that depicts the particular virtual player in a modified spatial location with respect to other objects in the frame, consistent with the direction specified by the user input. Alternatively, if the input event and the trigger state result in a gameplay output of a particular virtual player shooting a puck, the response frame is the first of a series of frames that depict the particular virtual player shooting the hockey puck (e.g., frame 510-3, FIG. 5B). In some implementations, rendering the response frame comprises introducing a new virtual object, modifying an existing virtual object, or modifying any other aspect of gameplay in accordance with the processed gameplay output, and including the new virtual object, the modified existing virtual object, or any other aspect of the modified gameplay in the response frame.

The server system 114 proceeds to encode the response frame (e.g., using encoder 142) and transmit (616) the encoded response frame to the media device 106. Upon receiving the encoded response frame from the server system 114, the media device 106 decodes (e.g., using content decoding module 320) the response frame, and causes the decoded response frame to be displayed (620) to the user (e.g., using output device 108).

Returning to FIGS. 5B and 5C, two sequences of video frames (510 and 520) are depicted showing the same input event (shooting a puck) but different response frames (successful shot 510-2 vs. blocked shot 520-3) due to different amounts of latency present in the gaming environment 500. These sequences are examples of the gameplay process 600 applied to the gaming environment 500.

FIG. 5B depicts a first scenario 550, including a sequence of video frames 510 showing three virtual players (A, B, and C) playing a hockey game, as well as a table 512 of game states T1-T3 (e.g., stored in log 460, FIG. 4). Player A is controlled by the user of controller 102, and Players B and C are controlled by other users of other controllers, by computer-controlled algorithms, or by a combination thereof. At state T1, Player A has a clear shot on the goal (denoted as "Clear" in table 512); accordingly, the game server transmits a frame 510-1 to the user's display 108 denoting this state. When the user controlling Player A views frame 510-1 on the display 108, the user sees that Player A has a clear shot on the goal, and therefore decides to command Player A to shoot the puck. In other words, frame 510-1 triggers the user to input a "shoot" command. The "shoot" command is sent as an input event to the game server 122. When the game server 122 receives the "shoot"

input (denoted as "In" in table 512), the game server is currently processing state T2, at which Player A no longer has a clear shot (denoted as "No Shot" in table 512). However, the game server 122 correctly determines that the trigger frame (denoted as "T" in table 512) was frame 510-1. According to the state of the game when frame 510-1 was displayed (the trigger state T1), Player A still had a clear shot on the goal; therefore, the game server 122 processes a subsequent state T3 according to the "shoot" command and the T1 state (clear shot). According to the game engine, if a player shoots while the player has a clear shot, the subsequent state includes a successful shot sequence, and this sequence is processed at state T3 (denoted as "Score" in table 512). As such, the game server renders a response frame 510-2 depicting Player A shooting the puck past Player C and transmits the response frame to the user. From the user's perspective, the response frame depicts the actions that the user intended at the time of the input event. As such, by correctly determining the trigger state corresponding to the user's input, the game server processes gameplay based on the user's intent.

FIG. 5C depicts a second scenario 552, including a sequence of video frames 520 showing the same game and players as in scenario 550, as well as a table 522 of game states T1-T3 (e.g., stored in log 460, FIG. 4). Like the previous scenario, at state T1, Player A has a clear shot on the goal (denoted as "Clear" in table 522); accordingly, the game server transmits a frame 520-1 to the user's display 108 denoting this state. When the user views frame 520-1 on the screen 108, the user sees that Player A has a clear shot on the goal, and therefore decides to command Player A to shoot the puck. The "shoot" command is sent as an input event to the game server 122. Like the previous scenario, when the game server 122 receives the "shoot" input (denoted as "In" in table 522), the game server is currently processing state T2, at which Player A no longer has a clear shot (denoted as "No Shot" in table 522). However, unlike the previous scenario, the game server 122 does not correctly determine the trigger frame (denoted as "T" in table 522). Instead, the game server assumes that the trigger frame was the last frame to be rendered in accordance with the current state T2, which, in this example, is frame 520-2. Alternatively, the game server may not have even attempted to determine a trigger frame, and instead processes a gameplay output based on the current state T2 (no shot). In either case, the game server processes a subsequent state T3 according to the "shoot" command and the T2 state (no shot). According to the game engine, if a player shoots while the player does not have a clear shot, the subsequent state includes a blocked shot sequence, and this sequence is processed at state T3 (denoted as "Block" in table 522). As such, the game server renders a response frame 520-3 depicting Player A attempting to shoot the puck but being blocked by Player C, and transmits the response frame to the user. From the user's perspective, the response frame depicts actions that the user did not intend at the time of the input event. Specifically, the user intended to have Player A shoot while Player C was not in the way; instead, Player A did not shoot as quickly as the user intended and the shot was blocked as a result. As such, by failing to correctly determine the trigger state corresponding to the user's input, the game server may process gameplay events contrary to the user's intent, which may potentially cause the user (and many other users) to lose interest in playing the game and/or using gaming environment 500.

In each of the two scenarios described above, the input event occurs at the same time; however, depending on how long it takes for the input event to reach the game server, the response frame depicts two very different outcomes. This is because if the server receives the user's input while processing a game state that is later in time (e.g., T2) than the game state that triggered the user to make the input (e.g., T1), the server may incorrectly process a gaming output based on incorrect information about the timing of the user input. Since it is paramount for the gaming platform to avoid this kind of inconsistency, it is important for the gaming platform to detect and compensate for the various latencies introduced in the gaming environment that cause these delays. By detecting the various latencies, the gameplay platform can more accurately correlate input events with the actual trigger states (as in scenario 550). By making these correlations, the gaming platform reduces the impact of uncontrollable and/or undetectable latency by processing each input event in a way that is consistent with the user's intent. As such, the various implementations described herein are an improvement over gaming platforms that do not attempt to determine, or incorrectly determine, accurate trigger states that correspond with user inputs.

In certain scenarios, depending on how much time has passed between the trigger state and a current state being processed by the game server, a particular gameplay output may contradict what has already been displayed to one or more users. For example, in FIG. 5C, frame 520-3 depicts a blocked shot. However, if game server determines, during state T3, that the trigger state was T1, in some implementations, the game server attempts to retroactively reconcile the user's intent with the current state of the game. In other words, the user's intent was to shoot the puck while Player A had a clear shot, while the current state of the game (T3) is displaying player C between Player A and the goal. In order to reconcile the user's intent (puck moving toward goal) with the current state (Player C in the puck's way), the game server may render a sequence of response frames with the puck moving toward the goal, despite Player C being in the way (e.g., frame 510-3, FIG. 5B). The response frames may appear to be inconsistent with the current game state; however, they are consistent with the user's intent during the past (trigger) game state. Game developers may plan for these contingencies in advance by, for example, designing animations that reconcile inconsistent game states. Example reconciliation animations include immediately shifting a virtual character or object to an intended position (even if this may appear to violate the in-game physics), or advancing the game state in the intended manner without showing the correct animation (e.g., updating the score without showing the puck arrive at the goal, or classifying a monster as having sustained a wound even though the monster appeared to have moved out of the way before being shot). In some implementations, reconciling a current game state with a game state intended by the user at the time of the user interaction (the intended game state) comprises modifying a frame depicting the current game state to create a subsequent frame depicting the intended game state.

Shadow Tracking Environment

The following implementations are directed to providing a processing environment to enable a time-delayed version of a primary instance of a real time interactive application. The time-delayed version (also referred to herein as a "shadow process") operates with the same inputs as the primary instance, but operates at a configurable delay with respect to the primary instance. In the event the primary instance enters an undesired state, the time-delayed instance is paused prior to the undesired state occurring, enabling inspection, stepping, and other diagnostic functions.

In some implementations, each instance of the application is an executing version of the application, each being executed by a separate processing capability/processor. For example, in some implementations, each instance is executed by: a microprocessor (CPU), one or more cores of a multi-core CPU, a graphics processing unit (GPU), and/or one or more cores of a multi-core GPU. In some implementations, each instance of the application is a simulation running on a respective processing capability (e.g., GPU). By running parallel simulations in lockstep (with the second simulation receiving delayed inputs, or performing delayed operations), one instance is an early detector that alerts the system that an error or a fault (e.g., an anomalous, failed, or undesired state) is about to occur. This allows the system to stop and inspect the state of the program before the fault, and reconstruct one or more pre-fault states; whereas by the time the fault has occurred, it may have destroyed information of value that would have otherwise been available before the fault.

With only a single instance of an application, a processing system can trap the instance when it fails; but at that moment, the system may not understand why the failure occurred. Stated another way, with only a single instance, the system cannot look back in time to a state before the failure; there may be no way to reconstruct the pre-failure state and/or recover all of the information that is necessary to determine why the failure happened.

On the other hand, with a secondary time-delayed instance running in parallel, the system is able to stop a simulation or stop the run of an actual processing unit at a point in time when the simulation or processing unit is about to fail. In other words, the system has knowledge of a future state of the time-delayed instance, because the primary instance is running ahead and is executing or simulating the same application with the same stream of inputs. With this knowledge, the system can pause the execution before the failure, and carefully step forward, tracking information of interest (such as register data or variables). The system can dump one or more of these pre-error states and access information that would otherwise not have been accessible had the failure happened, allowing the system to reconstruct the exact state of the execution or simulation before the failure. The reconstructed pre-failure states allow the system or a developer to determine why the failure will occur in the second instance in the future.

Some implementations described herein describe an online gaming application (e.g., a gaming application described with respect to FIGS. 1-6 above) as an example processing environment. However, knowing in advance that a processing system is going to fail is useful in many other types of processing environments, with an online gaming server being only one example. For instance, the various implementations described herein may be implemented on any processing environment involving a GPU. While CPUs are relatively transparent from a debug perspective, GPUs are relatively opaque because it is much more difficult to reverse engineer what occurred in a GPU just before the failure. As such, it is difficult in some cases and impossible in others to determine the cause of the failure. For example, many aspects of a GPU are not readily inspectable. There may be hidden states and a lack of built-in debug capabilities that make it difficult to reverse engineer what is happening near the event of failure. More specifically, since GPUs have many different kinds of registers and pipelines involving parallel operations, there is a lot to look at compared to some CPUs which are relatively simple to inspect. Even if it were possible to inspect every register, every variable, every aspect of every pipeline, and so forth, it may not be practical in a runtime environment (e.g., while the application or program is running) to continually dump all of that information, due to the vast amount of information associated with each processing state. However, with fore-knowledge of a particular event, it would be much more reasonable to look at all the relevant information at that point. In other words, a developer could recover the relevant information in a more workable amount. Depending on how many more cycles of data there are before the fault, that is how much data the developer would need in order to reconstruct the conditions that led to the fault, thereby obtaining the information needed to fix the application or program and avoid future faults.

In addition to being relevant to processing systems that include GPUs, implementations described in this specification are relevant to any processing system involving processors with qualities that make it difficult to debug or otherwise determine causes for failed states.

Some of the various implementations described herein are implemented on a server, such as the game server 122 (described with respect to FIG. 1 above) or a dedicated state preservation system 170 (described with respect to FIGS. 7-10 below). In these implementations, the secondary process is executed for a particular application when there is spare processing capacity at the server. For instance, if the game server is only using a subset of available GPUs to host online gaming sessions, one or more of the spare GPUs may be used to execute time-delayed secondary gaming sessions. This way, if a particular session fails, the secondary session preserves one or more of the pre-failure states. This provides a chance for developers to capture failure information in a real time production environment with consumer interaction, which provides more realistic use cases than sessions that are solely executed in a lab or test environment. As such, instead of replicating test cases in a lab environment, developers have access to real time failure information in a production environment. Further, for implementations that only use spare processing capacity, developers have access to this information without negatively affecting the amount of processing capacity available for new sessions. In some implementations, the pre-failure state preservation processing systems described herein run continuously for each session (e.g., for each session 130 described above).

Regardless of the processing environment, the various implementations described herein have the technical effect of preserving a pre-error processing state, allowing for the evaluation of causes of real time failure events in programs, applications, and/or virtualized simulations. Creation of a slightly delayed instance of the same program with the same sequence and timing of inputs creates the opportunity to stop the program before the occurrence of a known fault (e.g., due to having occurred in the primary instance). Having the ability to analyze a program before it fails is an improvement over debugging programs in general, which can only look backward after the failure and do not always have access to the information necessary to completely reconstruct the pre-failure conditions that caused the failure to begin with. Further, the embodiments described herein amount to an improvement over debugging programs which use slightly different versions of the program (e.g., a production version versus a lab version, or a real time version versus a diagnostic test version), since the instant implementations allow for the real time analysis of consumer facing programs in a production environment, thereby facilitating evaluation of actual performance of the program in the field. Further, the embodiments described herein amount to an improvement over debugging programs which use different input data sets (e.g., consumer inputs versus lab inputs), since the presently described implementations allow for the real time analysis of consumer facing programs being manipulated by actual inputs from real consumers in the field, thereby facilitating evaluation of more realistic operation of the program in the context of consumer use. In the online gaming example, the presently described implementations facilitate preservation of pre-error game states for production versions of the game, and for actual gaming inputs provided by users of the game during real time gameplay and actual gaming conditions.

Additionally, having two instances of the same program running in lockstep (with one being delayed) amounts to an improvement over techniques which require the same program to be run multiple times, because even if it were possible to determine internal processing states of a GPU around the time of a fault, these internal processing states may change each time the program is run, thereby invalidating the usefulness of information describing these internal states for subsequent executions of the program.

As discussed above, the various implementations described herein allow for forward debugging. Compared to after-the-fact debugging, where the program or developer only has access to a subset of the data of interest (e.g., data necessary to reconstruct the conditions that led to the fault), forward debugging provides access to, before the fault occurs, more data that has not yet been destroyed by the fault. In other words, the debugging program or developer knows that the data sitting in the registers at a particular moment in time is about to cause a fault. With this knowledge and access to the data, the developer can apply forward debugging techniques (e.g., evaluating each successive processing state up until the fault) in order to more accurately determine the cause of the fault. More specifically, the developer can more easily determine the exact combination of input sequences and processing states that existed leading up to the fault, and with this knowledge, can update the program so that in the future, the same input sequences and processing states do not cause the same errors.

Pre-Error State Preservation System

Figure 7:
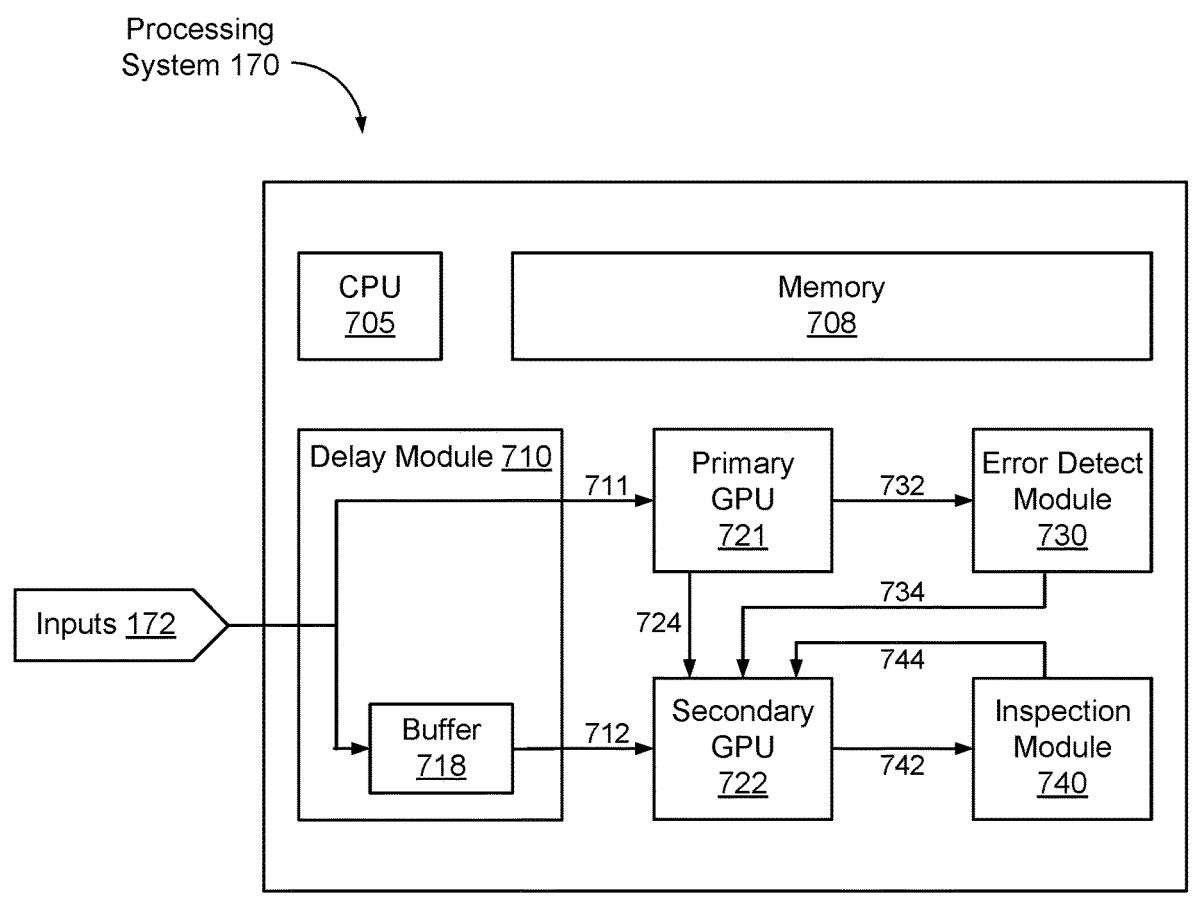
FIG. 7 is an example processing system in accordance with some implementations.

FIG. 7 is an example pre-error processing state preservation system 170 (also referred to as "processing system" 170) in accordance with some implementations. The processing system 170 includes a processing unit (e.g., CPU 705) for controlling overall processing of the system 170, and memory 708 for storing various programs and data (described in more detail with reference to FIG. 8). The processing system 170 further includes two or more processing units (for example, GPUs) 721 and 722, for executing a primary and a secondary instance of a program, respectively. The processing system 170 includes a delay module 710 for controlling the timing of inputs 172 with respect to the primary and secondary instances of the program. The delay module 710 includes at least one buffer 718 for buffering one stream relative to the other. The processing system further includes an error detection module 730 for detecting when the primary GPU 721 enters an undesired state (e.g., an anomalous or failed state caused by an error or fault). The processing system further includes an inspection module 740 for facilitating evaluation of preserved pre-error states of the secondary GPU 722.

In some implementations, the primary GPU 721 and inputs 172 correspond to the GPU 140 (in game server 122) and gaming inputs 210 described above with reference to FIGS. 1-6. As mentioned above, it is important to note that these gaming implementations are only examples of interactive programs being executed on processing units in real time, and that the implementations described herein apply equally to other non-gaming examples. However, since it may be easier to understand some of the concepts described herein by referring to an example application, the example gaming environment described above will be used as the basis for an example application, even though these concepts apply equally to non-gaming applications.

In the context of a gaming application, inputs 172 are supplied by users of game controllers who, as they play the game, generate a stream of inputs (also referred to as input events or instructions). A game engine (e.g., processor 721) receives the one or more inputs 172 and processes an output game state in accordance with (i) the one or more inputs 172 and (ii) a current game state, as described above with regard to FIGS. 5 and 6. For non-gaming applications, the processor 721 receives one or more inputs 172 and generates a subsequent processing state in accordance with (i) the one or more inputs 172 and (ii) a current processing state.

Applying the above examples to the processing system 170 in FIG. 7, the processing system 170 receives a stream of inputs 172. The delay module 710 separates the stream into a primary stream 711 and a secondary stream 712. The only difference between each stream is the timing at which each input in the stream is received by respective GPUs 721 and 722. For instance, if a first input and second input are received by the delay module 710 at a delta of 500 ms, the primary GPU 721 receives the first and second inputs 500 ms apart, and the secondary GPU 722 also receives those same inputs 500 ms apart. However, due to the buffer 718, the secondary stream 712 as a whole is delayed with respect to the primary stream 711. Therefore, in the aforementioned example, if the buffer 718 is configured to delay the secondary stream 712 by 1 second, GPU 721 receives the first and second inputs at 0 and 0.5 seconds (corresponding to the 500 ms delta between inputs), and GPU 722 receives the first and second inputs at 1.0 and 1.5 seconds (corresponding to the 500 ms delta between inputs and the 1 second delay added by the buffer 718).

In some implementations, the delay module 710 only buffers the secondary stream 712 (as shown in FIG. 7). Alternatively, the delay module 710 buffers both streams 711 and 712, but with separate delays. For example, a buffer (not shown) operating on the primary stream 711 may delay the stream by 1.0 seconds, and the buffer 718 may delay the secondary stream 712 by 2.0 seconds. As long as the secondary stream 712 is delayed with respect to the primary stream 711, the examples described herein can be implemented.

During ordinary operation, the primary GPU 721 and the secondary GPU 722 process the respective input streams 711 and 712 until the inputs 172 cease to be received by the processing system 170 (e.g., because the user(s) have stopped playing the game). However, if the primary GPU 721 enters an undesired state (e.g., due to a fault), the processing system 170 causes the secondary GPU 722 to pause its processing.

In some implementations, the primary GPU 721, upon determining that it has entered an undesired state, sends a pause signal 724 to the secondary GPU 722. Additionally or alternatively, an error detection module 730 monitors output data 732 (e.g., subsequent processing states) from GPU 721 and detects, either from information in the output data or from a lack of expected information in the output data, that the primary GPU 721 has entered an undesired state. Accordingly, the error detection module 730 sends a pause signal 734 to the secondary GPU 722. Upon receiving a pause signal 724 or 734, the secondary GPU 722 pauses processing on whatever processing state it is currently processing (a current processing state), and sends information 742 about the current state to the inspection module 740. The information 742 is referred to herein as preserved information about a pre-error state, or information about a preserved pre-error state. The preserved information 742 is accessible by a debugging program or a developer, and either or both may apply forward debugging techniques, including but not limited to forward stepping the secondary GPU 722 by sending a signal 744 instructing the GPU 722 to process a state subsequent to the current pre-error state. Upon processing successive states, the secondary GPU 722 sends information 742 about each successive state for inspection and/or evaluation by a forward debugging program or a developer.

Figure 8:
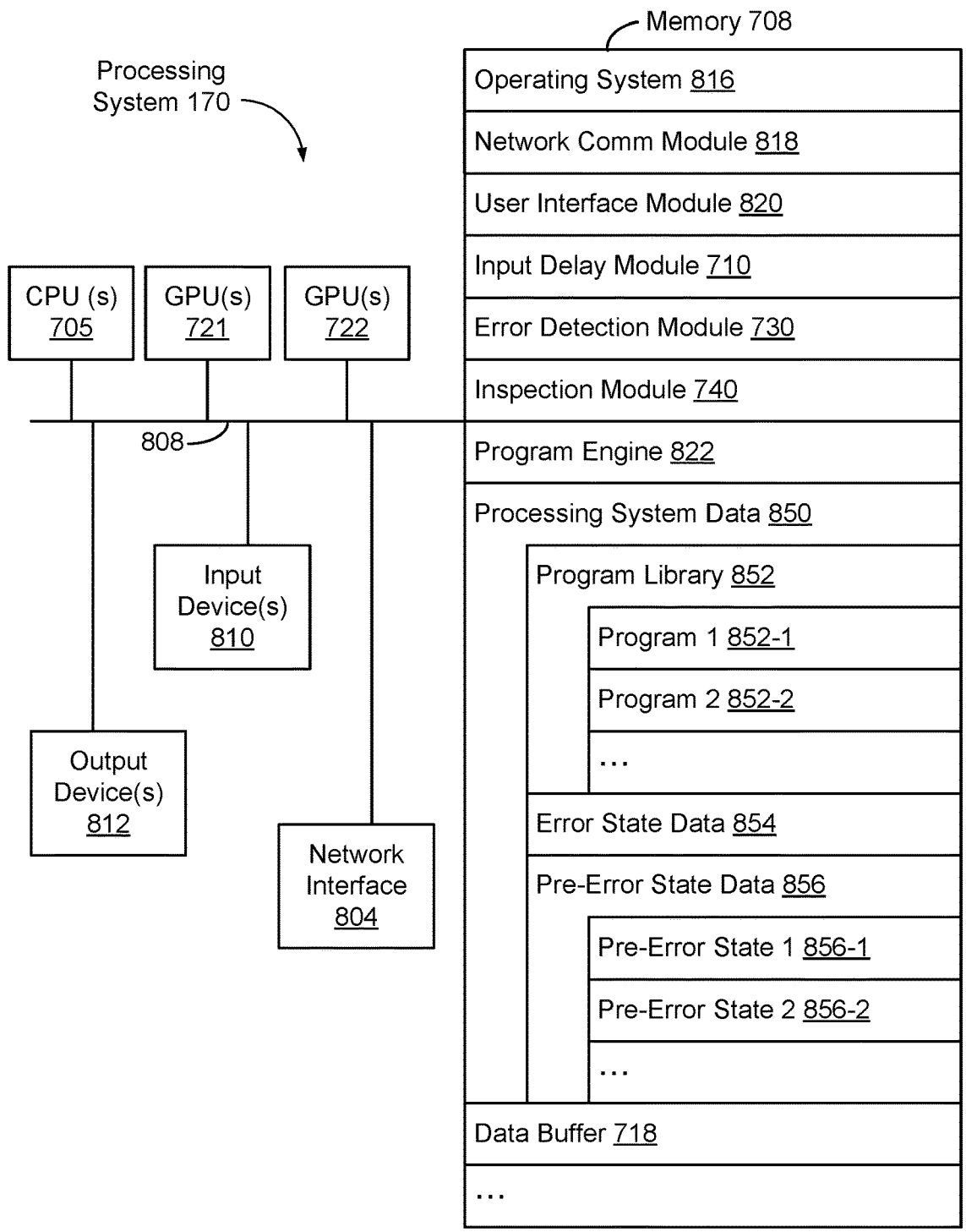
FIG. 8 is a block diagram illustrating an example processing system in accordance with some implementations.

FIG. 8 is a block diagram illustrating an example processing system 170 in accordance with some implementations. The processing system 170, typically, includes one or more processing units (e.g., CPU(s) 705, GPU(s) 721 and 722), one or more network interfaces 804, memory 708, and one or more communication buses 808 for interconnecting these components (sometimes called a chipset). The processing system 170 may optionally include one or more input devices 810 that facilitate user input, such as a keyboard, a mouse, a voice-command input unit or microphone, a touch screen display, a touch-sensitive input pad, a gesture capturing camera, or other input buttons or controls. Furthermore, the processing system 170 may use a microphone and voice recognition or a camera and gesture recognition to supplement or replace the keyboard. In some implementations, the processing system 170 optionally includes one or more cameras, scanners, or photo sensor units for capturing images, for example, of graphic series codes printed on electronic devices. The processing system 170 may also include one or more output devices 812 that enable presentation of user interfaces and display content, including one or more speakers and/or one or more visual displays. Examples of display content include information related to processing states as captured by the inspection module 740.

Memory 708 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 708, optionally, includes one or more storage devices remotely located from one or more processing units. Memory 708, or alternatively the non-volatile memory within memory 708, includes a non-transitory computer readable storage medium. In some implementations, memory 708, or the non-transitory computer readable storage medium of memory 708, stores the following programs, modules, and data structures, or a subset or superset thereof:

Operating system 816 including procedures for handling various basic system services and for performing hardware dependent tasks;

Network communication module 818 for connecting the processing system 170 to other devices (e.g., various servers, client device(s), and/or media device(s)) via one or more network interfaces (wired or wireless) and one or more networks, such as the Internet, other wide area networks, local area networks, metropolitan area networks, and so on;

User interface module 820 for enabling presentation of information (e.g., a graphical user interface for presenting application(s), widgets, websites and web pages thereof, and/or games, audio and/or video content, text, etc.) at client device(s), or at developer device(s) for viewing the information related to processing states as captured by the inspection module 740;

Input delay module 710 for controlling a timing offset of the secondary input stream 712 with respect to the primary input stream 711 (e.g., by configuring a buffer 718);

Error detection module 730 for detecting an error state of a primary processing unit (e.g., GPU 721), and in some implementations, sending a pause signal to a secondary processing unit (e.g., GPU 722) as a result of the error detection;

Inspection module 740 for preserving information associated with one or more pre-error states of a secondary processing unit (e.g., GPU 722) for inspection and/or evaluation in a forward debugging context;

Program engine 822 for determining processing outputs or output states based on (i) one or more user inputs 172, and (ii) processing states corresponding to the user inputs;

Processing system data 850 including:
   Program library 852 for storing programs to be executed or simulated by the processing units (e.g., GPUs 721 and 722);
   Error state data 854 for storing information associated with an error state of a primary GPU 721 (e.g., an information dump resulting from a fault); and
   Pre-error state data 856 for storing information associated with pre-error states of a secondary GPU 722 (e.g., register data, variables, internal state information, and various other data that may not be accessible in the event of a fault); and
Data buffer 718 for temporarily storing user inputs 172 received in an input stream in order to provide a delayed stream 712 of inputs to a secondary GPU 722.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 708, optionally, stores a subset of the modules and data structures identified above. Furthermore, memory 708, optionally, stores additional modules and data structures not described above.

In some implementations, the processing system 170 and memory 708 may further include any or all of the components, modules, and data described with reference to the server system 114 and memory 146 of FIG. 4 above.

Example Shadow Process

Figure 9:
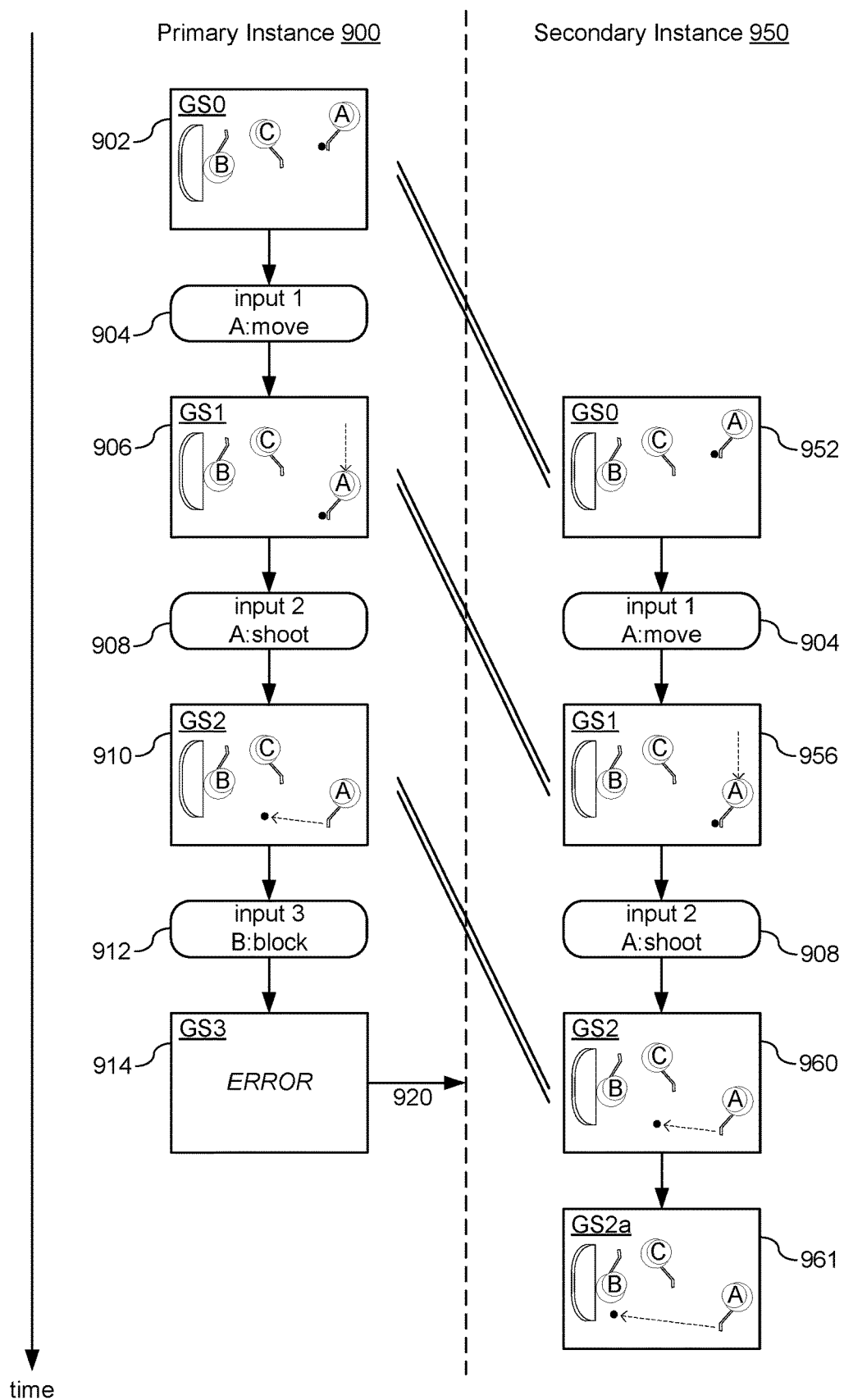
FIG. 9 illustrates example scenarios of a gameplay process in accordance with some implementations.

FIG. 9 depicts an example primary instance 900 of a particular program 852 being executed by a primary GPU 721, and a secondary (delayed) instance 950 of the particular program 852 being executed by a secondary GPU 722 in a processing system 170 in accordance with some implementations. In some implementations, the program 852 is a gaming application as described with reference to FIGS. 1-6 above.

The primary instance 900 of the program 852 executes on GPU 721. At the time of a current processing state 902 (game state GS0), the processing system 170 receives a first user input 904, instructing a virtual player A to move down. The delay module 710 passes the input 904 to GPU 721 without delay (or alternatively, the input is passed to the GPU 721 without being processed by a delay module). The primary GPU 721 processes the first user input 904 in accordance with the current processing state 902 (game state GS0), and generates a subsequent processing state 906 (game state GS1) as a result of the current state 902 and the first input 904.

Meanwhile, the second instance 950 of the program 852 executes on GPU 722. The delay module 710 buffers the first input 904 and passes it to the second instance 950 at a time subsequent to the time that the input 904 was received by the first instance 900. The secondary GPU 722 processes the first user input 904 in accordance with the current processing state 952 (corresponding to state 902 in the first instance), and generates a subsequent processing state 956 (corresponding to state 906 in the first instance) as a result of the current state 952 and the first input 904.

The processing system 170 receives a second user input 908, instructing player A to shoot the puck. The delay module 710 passes the input 908 to GPU 721 without delay (or alternatively, the input is passed to the GPU 721 without being processed by a delay module). The primary GPU 721 processes the second user input 908 in accordance with the current processing state 906 (game state GS1), and generates a subsequent processing state 910 (game state GS2) as a result of the current state 906 and the second input 908.

Meanwhile, the delay module 710 buffers the second input 908 and passes it to the second instance 950 at a time subsequent to the time that the input 908 was received by the first instance 900. The secondary GPU 722 processes the second user input 908 in accordance with the current processing state 956 (corresponding to state 906 in the first instance), and generates a subsequent processing state 960 (corresponding to state 910 in the first instance) as a result of the current state 956 and the second input 908.

The processing system 170 receives a third user input 912, instructing player B to block the puck. The delay module 710 passes the input 912 to GPU 721 without delay (or alternatively, the input is passed to the GPU 721 without being processed by a delay module). The primary GPU 721 processes the third user input 912 in accordance with the current processing state 910 (game state GS2), and generates a subsequent processing state 914 (an error state) as a result of the current state 910 and the second input 912. In some implementations, the primary GPU 721 sends, upon entering the undesired state, a pause signal 724 (see FIG. 7) to the secondary GPU 722 (the pause signal is labeled as signal 920 in FIG. 9). In some implementations, the error detection module 730 detects an error in the output 732 of the primary GPU 721, and sends a pause signal 734 (see FIG. 7) to the secondary GPU 722.

Meanwhile, the delay module 710 buffers the third input 912 in order to pass it to the second instance 950 at a time subsequent to the time that the input 912 was received by the first instance 900. However, before the secondary GPU 722 has a chance to process the third user input 912, the secondary GPU 722 receives the pause signal 920 (and/or signal 734) from the primary GPU 721 (or the error detection module 730), and pauses processing as a result. As such, execution of the second instance 950 of the program 852 is paused in a current processing state 960 (corresponding with state 910 in the first instance). The current state 960 is a pre-error state, because it corresponds with a processing state in the primary instance that occurred before the error state. Information 742 (see FIG. 1) associated with the current pre-error state 960 is sent to the inspection module 770 for evaluation. In some implementations, one or more subsequent pre-error states 961 (for example, game state GS2a) are generated by the secondary GPU 722, and information 742 associated with these states is sent to the inspection module 740 for further evaluation. In some implementations, successive pre-error states are generated by the secondary GPU 722 until the secondary GPU 722 reaches the error state.

In some implementations, one or more of the user inputs 904, 908, and 912 are different pluralities of user inputs. For instance, in the above example, a plurality of user inputs 912 may have caused the error state 914 in the primary instance 900. As such, individually stepping through each input in the plurality of inputs 912 and generating intermediate pre-error states in the secondary instance 950 may provide more accurate information detailing the cause of the error. Specifically, a debugging program or a developer would more accurately be able to determine the exact input and processing state that caused the failure, which would provide a better basis for altering the programming of the application to avoid future failures caused by the offending input/state combination(s).

Pre-Error State Preservation Method

Figure 10:
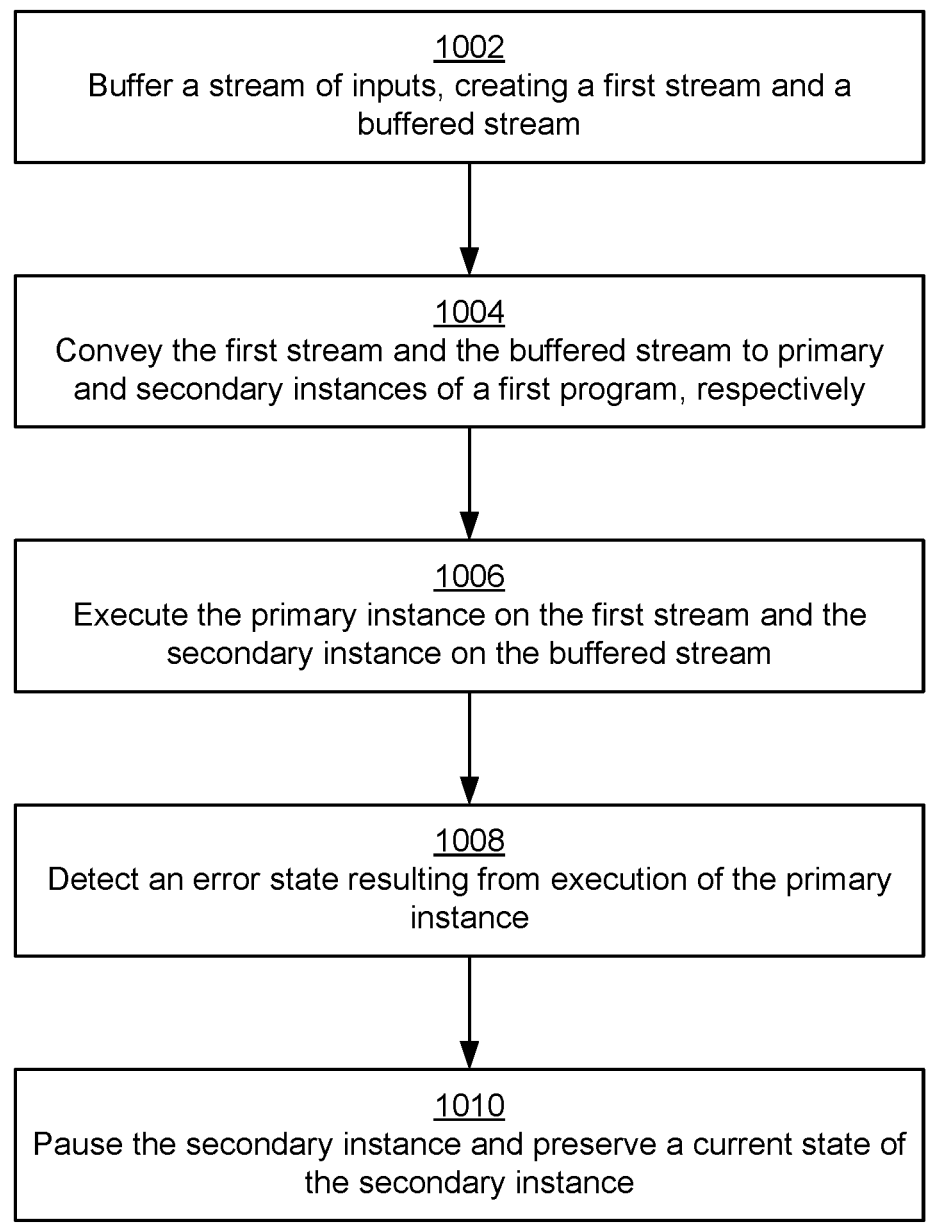
FIG. 10 is a flow diagram illustrating an example method for preserving a pre-error state in a processing system in accordance with some implementations.

FIG. 10 is a flow diagram illustrating an example method 1000 for preserving pre-error processing states in accordance with some implementations. Method 1000 is, optionally, governed by instructions that are stored in a computer memory or non-transitory computer readable storage medium and that are executed by one or more processors of the processing system 170. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1000 may be combined and/or the order of some operations may be changed.

Method 1000 is performed by the processing system 170 including one or more processing units (e.g., CPU 705) and memory storing programs for execution by the processing cores. The processing system 170 receives a first stream of inputs 172/711 (FIG. 7) and buffers (1002) the first stream of inputs to generate a buffered stream of inputs 712 identical to the first stream of inputs 711. In some implementations, the inputs are network packets that are sent over a communication network (e.g., the internet) from one or more client devices. In some implementations, each stream 711 and 712 is buffered, with the buffer for the first stream 711 having a first depth (e.g., zero depth), and the buffer for the second stream 712 having a second depth (e.g., a depth of N, where N is associated with a predetermined offset between the two streams 711 and 712). While the inputs in the buffered stream 712 are delayed with respect to the inputs in the first stream 711, the times in between respective inputs are preserved (e.g., the delta between inputs 904 and 908 to the primary instance 900 is equal to the delta between inputs 904 and 908 to the secondary instance 950). Therefore, in some implementations, from the perspective of the second processing unit executing the secondary instance of the program, the input events are not delayed at all. In other words, the sequence of inputs (values and timing) arriving at the first processing unit (e.g., GPU 721) is the same as the sequence of inputs (values and timing) arriving at the second processing unit (e.g., GPU 722), but for the global offset described above with respect to the buffer.

The processing system 170 conveys (1004) the first stream 711 to a primary instance 900 of a first program 852 (e.g., executing on a primary GPU 721), and conveys the buffered stream 712 to a secondary instance 950 of the first program 852 (e.g., executing on a secondary GPU 722). A first (primary) processing unit (e.g., GPU 721) executes (1006) the primary instance 900 on the first stream 711 in real time, and a second (secondary) processing unit (e.g., GPU 722) executes the secondary instance 950 on the buffered stream 712 with a predefined time delay with respect to the execution of the primary instance 900 on the first stream 711.

The processing units (e.g., GPUs 721 and 722) execute each instance of the program 852 until either the primary processing unit (e.g., GPU 721) or the error detection unit 730 detects (1008) an error state resulting from execution of the primary instance. In some implementations, detecting an error state comprises identifying a fault in the first instance. In some implementations, detecting an error state comprises identifying invalid output data or an undesired output state from the primary processing unit (e.g., GPU 721). For implementations in which the primary processing unit detects an internal fault, the primary processing unit sends the pause signal or flag to the secondary processing unit. Additionally or alternatively, for implementations in which the primary processing unit does not or cannot detect an internal fault (e.g., because the processing unit completely shuts down and/or cannot continue processing data), the error detection unit 730, which continually monitors the state of the primary processing unit, sends the pause signal or flag to the secondary processing unit.

In response to detecting the error state, either the primary GPU 721 or the error detection module 730 pauses (1010) the secondary instance 950, via a pause signal 724 and/or a pause signal 734 (see FIG. 7), thereby preserving a current state of the secondary instance 950, wherein the current state of the secondary instance 950 corresponds to a pre-error state of the primary instance 900.

Notes Regarding the Disclosure

Reference has been made in detail to various implementations, examples of which are illustrated in the accompanying drawings. In the above detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

It will be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, without changing the meaning of the description, so long as all occurrences of the first device are renamed consistently and all occurrences of the second device are renamed consistently. The first device and the second device are both device, but they are not the same device.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of preserving a pre-error state of a processing unit, comprising:
at a computer system having one or more processing units and memory storing one or more programs for execution by the one or more processing units:
receiving a first stream of inputs;
buffering the first stream of inputs to generate a buffered stream of inputs identical to the first stream of inputs;
conveying the first stream of inputs to a primary instance of a program;
conveying the buffered stream of inputs to a secondary instance of the program;
executing the primary instance on the first stream of inputs in real time;
executing the secondary instance on the buffered stream of inputs with a predefined time delay with respect to execution of the primary instance on the first stream of inputs;
detecting, by the primary instance, an error state resulting from the primary instance executing on the first stream of inputs; and in response to detecting the error state:
    sending, by the primary instance, a signal to the secondary instance, wherein the signal pauses the secondary instance; and
    preserving a current state of the secondary instance, wherein the current state of the secondary instance corresponds to a pre-error state of the primary instance.

2. The method of claim 1, wherein the error state results from execution of the primary instance on a first input of the first stream of inputs; and
    wherein pausing the secondary instance comprises pausing the secondary instance prior to processing an input of the buffered stream of inputs corresponding to the first input of the first stream of inputs.

3. The method of claim 1, wherein the secondary instance, after the predefined time delay, runs concurrently with the primary instance.

4. The method of claim 1, wherein the error state obscures an aspect of the pre-error state of the primary instance; and
    wherein preserving the current state of the secondary instance comprises:
        recording an aspect of the current state of the secondary instance, wherein the aspect of the current state of the secondary instance corresponds with the aspect of the pre-error state of the primary instance.

5. The method of claim 4, wherein the aspect of the pre-error state of the primary instance is first stored data associated with the primary instance; and
    wherein the aspect of the current state of the secondary instance is second stored data associated with the secondary instance, wherein the second stored data corresponds with the first stored data.

6. The method of claim 1, wherein:
    executing the primary instance comprises generating a first output stream using a first processing unit; and
    executing the secondary instance comprises generating a second output stream using a second processing unit.

7. The method of claim 6, wherein detecting the error state comprises detecting an indicator in the first output stream.

8. The method of claim 1, further comprising:
    after preserving the current state of the secondary instance:
    resuming the secondary instance to obtain a subsequent state of the secondary instance; and
    preserving the subsequent state of the secondary instance, wherein the subsequent state of the secondary instance corresponds to a subsequent pre-error state of the primary instance.

9. The method of claim 8, wherein:
    pausing the secondary instance comprises ceasing to convey the buffered stream of inputs to the secondary instance; and
    resuming the secondary instance comprises conveying a single input from the buffered stream of inputs to the secondary instance.

10. The method of claim 1, wherein preserving the current state of the secondary instance comprises providing the current state of the secondary instance for inspection.

11. The method of claim 1, wherein the program is a real-time interactive application and the first stream of inputs is generated in response to a user interacting with the real-time interactive application.

12. A system, comprising:
    one or more processing units; and
    a memory coupled to the one or more processing units and storing one or more programs for execution by the one or more processing units, the one or more programs comprising executable instructions to cause the one or more processing units to:
    receive a first stream of inputs;
    buffer the first stream of inputs to generate a buffered stream of inputs identical to the first stream of inputs;
    convey the first stream of inputs to a primary instance of a program;
    convey the buffered stream of inputs to a secondary instance of the program;
    execute the primary instance on the first stream of inputs in real time;
    execute the secondary instance on the buffered stream of inputs with a predefined time delay with respect to execution of the primary instance on the first stream of inputs;
    detect, by the primary instance, an error state resulting from the primary instance executing on the first stream of inputs; and
    in response to detecting the error state:
        send, by the primary instance, a signal to the secondary instance, wherein the signal pauses the secondary instance; and
        preserve a current state of the secondary instance, wherein the current state of the secondary instance corresponds to a pre-error state of the primary instance.

13. The system of claim 12, wherein the error state results from execution of the primary instance on a first input of the first stream of inputs; and
    wherein the executable instructions which cause the one or more processing units to pause the secondary instance comprise executable instructions which cause the one or more processing units to pause the secondary instance prior to processing an input of the buffered stream of inputs corresponding to the first input of the first stream of inputs.

14. The system of claim 12, wherein the secondary instance, after the predefined time delay, runs concurrently with the primary instance.

15. The system of claim 12, wherein the error state obscures an aspect of the pre-error state of the primary instance; and
    wherein the executable instructions to cause the one or more processing units to preserve the current state of the secondary instance comprise executable instructions to cause the one or more processing units to record an aspect of the current state of the secondary instance, wherein the aspect of the current state of the secondary instance corresponds with the aspect of the pre-error state of the primary instance.

16. The system of claim 12, wherein:
    executing the primary instance comprises generating a first output stream using a first processing unit; and
    executing the secondary instance comprises generating a second output stream using a second processing unit.

17. The system of claim 16, wherein the executable instructions to cause the one or more processing units to detect the error state comprise executable instructions to cause the one or more processing units to detect an indicator in the first output stream.

18. The system of claim 12, wherein the executable instructions comprise executable instructions to further cause the one or more processing units to:
    after preserving the current state of the secondary instance:

resume the secondary instance to obtain a subsequent state of the secondary instance; and preserve the subsequent state of the secondary instance, wherein the subsequent state of the secondary instance corresponds to a subsequent pre-error state of the primary instance.

19. The system of claim 18, wherein:

the executable instructions to cause the one or more processing units to pause the secondary instance comprise executable instructions to cause the one or more processing units to cease to convey the buffered stream of inputs to the secondary instance; and the executable instructions to cause the one or more processing units to resume the secondary instance comprise executable instructions to cause the one or more processing units to convey a single input from the buffered stream of inputs to the secondary instance.

20. The system of claim 12, wherein the executable instructions to cause the one or more processing units to preserve the current state of the secondary instance comprise executable instructions to cause the one or more processing units to provide the current state of the secondary instance for inspection.

21. A non-transitory computer readable storage medium storing one or more programs, the one or more programs comprising executable instructions, which, when executed by an electronic computer system with one or more processing units, cause the electronic computer system to:

receive a first stream of inputs;

buffer the first stream of inputs to generate a buffered stream of inputs;

convey the first stream of inputs to a primary instance of a program;

convey the buffered stream of inputs to a secondary instance of the program;

execute the primary instance on the first stream of inputs in real time;

execute the secondary instance on the buffered stream of inputs with a predefined time delay with respect to execution of the primary instance on the first stream of inputs;

detect, by the primary instance, an error state resulting from the primary instance executing on the first stream of inputs; and in response to detecting the error state:

send, by the primary instance, a signal to the secondary instance, wherein the signal pauses the secondary instance; and preserve a current state of the secondary instance, wherein the current state of the secondary instance corresponds to a pre-error state of the primary instance.

* * * * *